United States Patent [19]
Donovan et al.

[11] Patent Number: 6,122,281
[45] Date of Patent: Sep. 19, 2000

[54] METHOD AND APPARATUS FOR TRANSMITTING LAN DATA OVER A SYNCHRONOUS WIDE AREA NETWORK

[75] Inventors: Mark J. Donovan, Derry; Stephen D. Augusta, Nashua; Christopher J. Oliver, Rochester, all of N.H.

[73] Assignee: Cabletron Systems, Inc., Rochester, N.H.

[21] Appl. No.: 08/800,363

[22] Filed: Feb. 14, 1997

Related U.S. Application Data

[63] Continuation-in-part of application No. 08/681,313, Jul. 22, 1996.

[51] Int. Cl.[7] .............................. H04L 12/56; H04I 3/16; H04J 3/24
[52] U.S. Cl. .......................... 370/401; 370/466; 370/474
[58] Field of Search .................... 370/400, 401, 370/404, 465, 466, 467, 470, 471, 473, 474, 902, 907, 914, 402, 463, 403, 405, 406, 407, 909, 916, 396, 397, 392, 469; 395/200.79, 200.76, 200.66, 200.01; 359/118, 119, 120

[56] References Cited

U.S. PATENT DOCUMENTS

| | | | |
|---|---|---|---|
| 4,644,533 | 2/1987 | Braff | 370/411 |
| 4,872,157 | 10/1989 | Hemmady et al. | 370/400 |
| 4,933,937 | 6/1990 | Konishi | 370/466 |
| 5,040,170 | 8/1991 | Upp et al. | 370/466 |
| 5,062,105 | 10/1991 | McKnight et al. | 370/404 |
| 5,103,447 | 4/1992 | Takiyasu et al. | 370/400 |
| 5,136,584 | 8/1992 | Hedlund | 370/474 |
| 5,220,562 | 6/1993 | Takada et al. | 370/400 |
| 5,241,543 | 8/1993 | Amada et al. | 370/509 |
| 5,307,345 | 4/1994 | Lozowick et al. | 370/61 |
| 5,414,704 | 5/1995 | Spinney | 370/389 |
| 5,490,252 | 2/1996 | Macera et al. | 395/200.79 |
| 5,526,315 | 6/1996 | Mochinaga et al. | 370/465 |
| 5,548,578 | 8/1996 | Matsune et al. | 370/401 |
| 5,568,486 | 10/1996 | Hurscroft et al. | 370/465 |
| 5,594,732 | 1/1997 | Bell et al. | 370/401 |
| 5,636,215 | 6/1997 | Kubo et al. | 370/409 |
| 5,671,224 | 9/1997 | Pyhalammi et al. | 370/401 |
| 5,832,236 | 11/1998 | Lee | 395/200.79 |

FOREIGN PATENT DOCUMENTS

| | | |
|---|---|---|
| 0 560 706 A2 | 9/1993 | European Pat. Off. . |
| 0 596 645 A1 | 5/1994 | European Pat. Off. . |
| 2 171 880 | 9/1986 | United Kingdom . |
| WO 92/04790 | 3/1992 | WIPO . |

OTHER PUBLICATIONS

T. Flanagan et al., "Transporting New High–Speed Services In Access Networks," The International Symposium On Subscriber Loops And Services, Boston, MA USA, Sep. 11–16, 1988, No. 1988, Sep. 11, 1988, Institute of Electrical And Electronics Engineers, pp. 165–168.

K. Rao et al., "SDH—Sonet Interworking", Interworking In Broadband Networks, Heterogeneity And Global Networking, Proceedings of Interworking, 1993, pp. 290–304.

*Primary Examiner*—Chi H. Pham
*Assistant Examiner*—Steven Nguyen
*Attorney, Agent, or Firm*—Wold, Greenfield & Sacks

[57] ABSTRACT

A packet of data is received from a LAN and transmitted over a WAN, by retaining the native LAN frame format of the packet during transmission across the WAN. Thus, LAN data may be transmitted over a SONET point-to-point link within a WAN network without the interim steps of creating ATM cells or other WAN transport packaging protocols. Instead, the LAN data may be transmitted directly over the SONET link as raw data, and reconstructed directly at the receiving end of the SONET link. A first buffer stores data from the LAN so that a corresponding packet size may be determined, and a second buffer stores data from the WAN to account for any speed difference between the LAN circuitry and WAN circuitry.

15 Claims, 22 Drawing Sheets

| FIG. 14A |
| FIG. 14B |

METHOD AND APPARATUS FOR TRANSMITTING LAN DATA OVER A SYNCHRONOUS WIDE AREA NETWORK

This is a continuation-in-part of copending and commonly owned U.S. Ser. No. 08/681,313 filed on Jul. 22, 1996, from which priority is claimed and which is hereby incorporated by reference in its entirety.

BACKGROUND OF THE INVENTION

1. Field of the Invention

This invention relates generally to computer networking systems and more particularly to transmitting data from a local area network over a wide area network.

2. Discussion of the Related Art

Computer networks are widely used to provide increased computing power, sharing of resources, and communications between users. Local area networks (LANs) may include a number of computer devices within a room, building, or site that are connected by high speed data links such as token ring, ethernet, or the like. LANs have traditionally been interconnected by bridges, hubs, and switches. A Wide Area Network (WAN) may link together different LANs. A WAN typically includes packet switches, microwave links, and satellite links. Thus, a network may include several hundred or more interconnected devices (nodes), distributed across several geographical locations, and belonging to several organizations.

LANs are typically used for high speed communications with relatively few nodes, while WANs are used for connecting a vast number of nodes, but generally at a slower speed. Therefore, LAN transport mechanisms and protocols are typically not appropriate for use on a WAN.

FIG. 1 shows an example of an arrangement in which a WAN couples together several LANs. In particular, FIG. 1 shows WAN 10 connecting LAN A, LAN B and LAN C. A LAN/WAN interface 12 provides translation, data formatting, and/or other protocol-related functions so that source and destination computers on LAN A may interface with source and destination computers on LAN B and LAN C. Similarly, LAN/WAN interface 14 allows LAN B to be coupled to WAN 10, and LAN/WAN interface 16 allows LAN C to be coupled to WAN 10.

One method of interfacing a LAN to a WAN is to provide a router-specific interface which substitutes a WAN physical link layer and a proprietary data link layer in each LAN data message, and rate-converts the LAN messages to WAN compatible speeds. Then the messages may be transmitted across the WAN. A drawback to such an approach is that many of the high-capacity networks that provide high-speed communications within the WAN are inflexible and expensive. Additionally, there is very limited network management and maintenance support capabilities, and very little, if any, spare signal capacity within frame structures, in the WAN protocol. Thus, this technique is generally very expensive and slow.

SONET (Synchronous Optical Network) is a standard for a high-capacity optical telecommunications network. It is a synchronous digital transport system intended to provide a more simple, economical and flexible network infrastructure. The Phase 1 SONET standard issued in March 1988, and is defined in "American National Standard for Telecommunications-Synchronous Optical Network (SONET) Payload Mappings", ANSI T1,105.02-1993 draft, which is incorporated by reference.

SONET may also be defined as an octet-synchronous multiplex scheme that defines a family of standard rates and formats. Despite the name, SONET is not limited to optical links. Electrical specifications have been defined for single-mode fiber, multi-mode fiber, and CATV 75 ohm coaxial cable. The transmission rates are integral multiples of 51.840 Mbps, which may be used to carry T3/E3 bit-synchronous signals. The allowed multiples are currently specified as:

| | |
|---|---|
| STS-1 | 51.840 |
| STS-3 | 155.520 |
| STS-9 | 466.560 |
| STS-12 | 622.080 |
| STS-18 | 933.120 |
| STS-24 | 1,244.160 |
| STS-36 | 1,866.240 |
| STS-48 | 2,488.320 |

The CCITT Synchronous Digital Hierarchy (SDH) defines a subset of SONET transmission rates, beginning at 155.520 Mbps, as set forth below:

| SONET | SDH equivalent |
|---|---|
| STS-3c | STM-1 |
| STS-12c | STM-4 |
| STS-48c | STM-16 |

As defined, SONET can be used in loop carrier, local network, and long haul network application areas.

FIG. 2 is a block diagram of SONET elements coupled together in a direct synchronous multiplexing mode. SONET line signals 21 are transmitted across the SONET digital cross-connect system 20. SONET terminal multiplexers 22, 24 receive tributary signals 23, for example from source and destination computers, and provide the SONET line signals.

One advantage of the SONET standard is that individual tributary signals may be accessed within the structure of the multiplexed SONET line signal. For example, SONET add-drop multiplexers 26 and 28 may each provide data from their respective tributary signals 25 onto the SONET digital cross-connect system 20.

The building block of the SONET protocol is a synchronous transport frame 30, shown in FIG. 3. Frame 30 includes transport overhead 34, and synchronous payload envelope (SPE) 32. Although data is transported serially, the frame 30 is typically represented by a two-dimensional map with N rows and M columns; a byte is provided at each row/column intersection. The signal bits are transmitted starting with the byte in the upper left hand corner of the frame 30, followed by the second byte in the top row, etc., until all of the bytes of the first top row are transmitted. The second and subsequent rows follow transmission of the first row in the same manner.

The SPE 32 includes individual tributary signals, and is designed to traverse a SONET network from end to end. The SPE 32 is assembled and disassembled only once, even though it may be transferred from one transport system to another (i.e., between several SONET network nodes) many times on its route through the SONET network.

Some signal capacity is allowed in each frame 30 for transport overhead 34 to provide support and maintenance facilities, such as alarm monitoring, bit-error monitoring, and data communications channels. Transport overhead 34 typically pertains only to an individual transport system and is not transferred when the SPE 32 is transferred between different transport systems.

One method of interfacing a LAN with a WAN, such as SONET, is to use the Asynchronous Transfer Mode (ATM) standard defined by the ATM Forum in the "UNI 4.0" specification. Each ATM cell has an overhead of 5/48 or 10.4%. This is a relatively large amount of overhead, when compared to a typical LAN packet. FIG. 4 shows an ATM cell 40, in which 48 bytes of ATM data 44 are transmitted with a 5-byte ATM header 42. In accordance with the ATM standard, an ATM cell always has 53 bytes.

FIG. 5 shows a SONET synchronous transport frame 49 that includes ATM cells. The synchronous transport frame 49 includes SPE 53 and a transport overhead 48 which includes section overhead 50, pointer 52 and line overhead 51. The pointer 52 is a reference which indexes the starting point of the SPE 53. SPE 53 includes path overhead 54, ATM cells 55A, 55B, 55C, 55D, and 55E, and other data. During times for which there are no ATM cells to transmit, an idle space is provided (see for example idle space 56 between two ATM cells 55D and 55E). In addition, because an integer number of ATM cells may not fit within a given SPE, there may be some empty space 57 (see FIG. 5) following the last ATM cell, or otherwise dispersed within the SPE.

FIG. 6 depicts a known process for converting LAN data to ATM cells for transport over a SONET network. In step 58, a LAN packet is received from a first IAN. The LAN packet is divided into 48-byte segments (step 59) in accordance with the fixed ATM cell size. An ATM 5-byte header is added to each of the 48-byte segments (step 60) to create a number of ATM cells. The ATM cells are packed into a SONET SPE (step 61). The appropriate SONET transport overhead is then added to the SPE (step 62) to create a synchronous transport frame. The frame may then be transmitted over the SONET-compatible network (step 63).

At another SONET multiplexer, the synchronous transport frame is received (step 64). The SONET transport overhead is removed (step 65) to yield the SPE. It is then necessary to unpack the ATM cells from the SPE in order to provide ATM cells (step 66). The ATM header is removed from each of the ATM cells (step 67). Only then may the LAN packet data be reconstructed from the ATM cell data (step 68). The reconstructed LAN packet may then be transmitted onto a second LAN (step 69).

As is evident from FIGS. 4–6, there is a significant amount of overhead which is required to transmit reconstructed LAN data over a SONET network using the ATM standard. This overhead includes not only signal bandwidth, for example the 5-byte ATM header added for each 48 bytes of data, but also significant processing time in order to divide the LAN packet, construct the ATM cells, and ultimately reconstruct the LAN packet.

SUMMARY OF THE INVENTION

In a preferred embodiment of the present invention, a method and apparatus are provided for transmitting a packet of LAN data over a WAN, by retaining a native LAN frame format of the packet across the WAN. Thus, data received from a LAN may be transmitted over a SONET point-to-point link without the interim steps of creating ATM cells or other reformatted message units. Instead, the LAN data may be transmitted directly over the SONET link as "raw data" (native LAN frame format) within SONET transport frames, and reconstructed directly at the receiving end of the SONET link.

In one embodiment, an interface is provided between a first network and a second network, including a first interface device, a second interface device, an input buffer, and a control circuit. The first interface device is capable of communicating across the first network in accordance with a protocol of the first network, and the second interface device is capable of communicating across the second network in accordance with a protocol of the second network. An input buffer receives and stores a packet from the first interface device. A control circuit is coupled between the first interface device and the second interface device, and is coupled with the input buffer. The control circuit determines a length of the packet and provides the packet and an indication of the length of the packet to the second interface device. The second interface device transmits the packet and the indication of the length of the packet across the second network.

Another embodiment of the invention is directed to a method for transmitting data from a first network to a second network, comprising the steps of receiving a data packet from a source on the first network, buffering the packet to provide buffered data, determining a length of the packet from the buffered data, and transmitting the packet and an indication of the length of the packet across a third network which is coupled between the first network and the second network, so that the packet is received at the second network.

Yet another embodiment is directed to an apparatus for transmitting data from a first network to a second network, comprising means for receiving a data packet from a source on the first network, means for buffering the packet to provide buffered data, means for determining a length of the packet from the buffered data, and means for transmitting the packet and an indication of the length of the packet across a third network which is coupled between the first network and the second network.

In any of the above embodiments, a receive buffer may store data to account for rate differences between the first and second networks. Additionally, a preamble may be transmitted along with the data, and a fill pattern may be transmitted when there are no packets to be transmitted. The first network may be a local area network, and the packet may be transmitted as a contiguous data stream in a frame format which is native to the local area network. The packet may be transmitted by an interface device operating in a "raw data" mode that does not require additional formatting or encapsulation, other than that required to comply with a protocol of the network over which the packet is transmitted.

These and other features and advantages of the present invention shall appear from the following detailed description and drawings.

DETAILED DESCRIPTION

Figure 7:
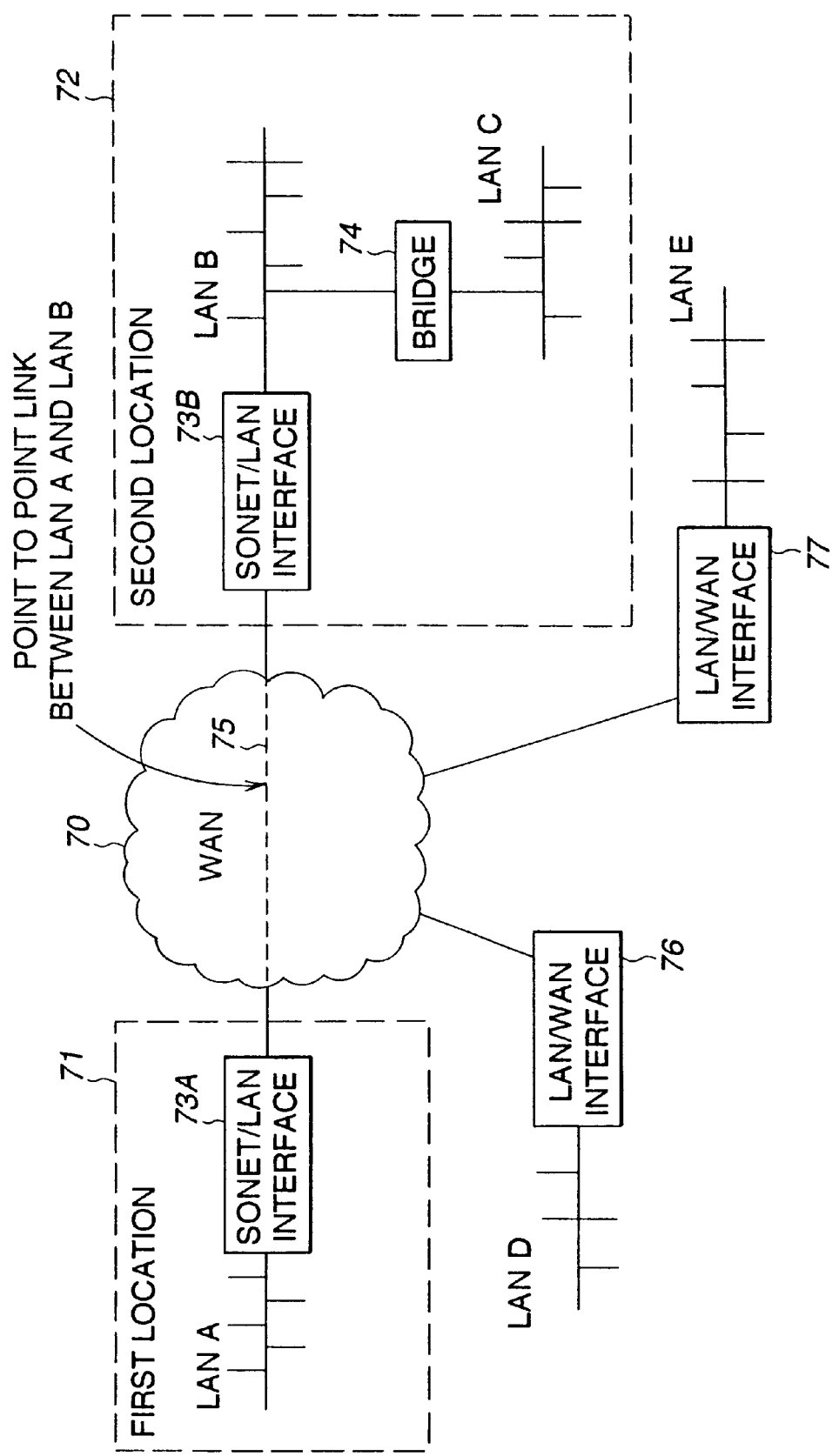
FIG. 7 is a high-level block diagram of an embodiment of the invention, in which a SONET network provides communications between two LANs.

There are many businesses or organizations having two or more geographically-separated LANs between which much data is transmitted. FIG. 7 shows an example in which LAN A is in a first location 71, such as a first building or campus, and LANs B and C are in a second location 72, such as a second building or campus. WAN 70 provides communications among these and several other LANs, for example LAN D and LAN E. In this example, LAN A is coupled to WAN 70 by SONET/LAN interface 73A, and LAN B is coupled to WAN 70 by SONET/LAN interface 73B. LAN B is also coupled to LAN C by bridge 74. LAN/WAN interface 76 provides communications between LAN D and WAN 70, and LAN/WAN interface 77 provides communications between LAN E and WAN 70. Suitable LAN/WAN interfaces 76, 77 are known in the art.

The first SONET/LAN interface 73A, second SONET/LAN interface 73B, and WAN 70 provide a point-to-point communications path 75 between LAN A and LAN B. In essence, the SONET/LAN interfaces 73A, 73B provide a bridge function between LAN A and LAN B, and also an effective interface between LAN A and LAN C. The SONET/LAN interfaces 73A, 73B transmit and receive data between LAN A and LAN B without formatting the packet data into separate cells, such as ATM cells. The point-to-point link 75 may be a SONET link within the WAN 70, which is created and maintained by a communications provider.

Figure 8:
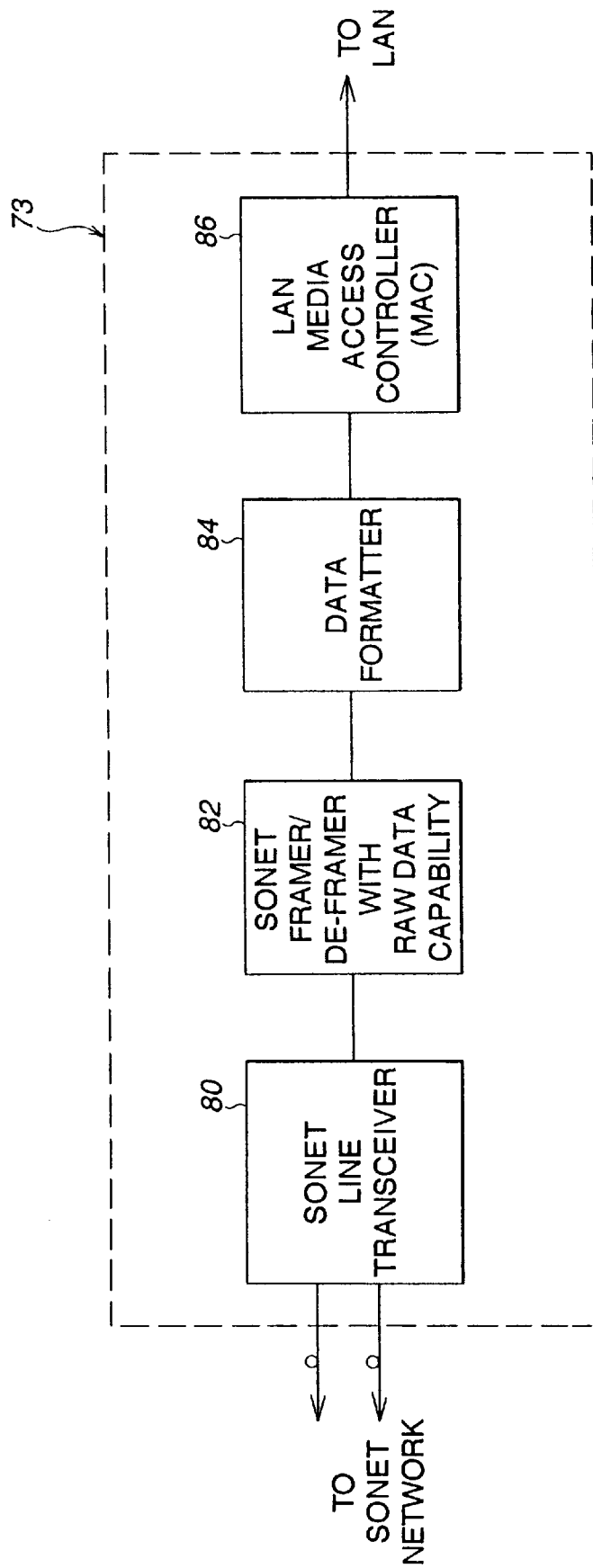
FIG. 8 is a block diagram of a SONET/LAN interface, such as that shown in FIG. 7.

FIG. 8 depicts more detail of the SONET/LAN interface 73. A SONET line transceiver 80 provides a physical interface with the SONET network. Coupled to the transceiver 80 is a SONET framer/deframer with raw data capability 82. The "raw data" capability, also referred to as "native frame format" capability, means that data can be transmitted across the SONET network without adding additional overhead to the data other than the overhead which is required by SONET. Examples of overhead required by SONET include transport overhead including payload pointers, path overhead including section overhead and line overhead, and virtual transport overhead including virtual payload pointers and virtual path overhead. In at least one SONET implementation, line overhead includes payload pointers, automatic protection switching, parity check, alarm information, section overhead includes frame alignment pattern, and STS identification, and parity check.

When a data packet is transported in its native frame format, this means that the data packet is still recognizable (arranged) as it was when transported across a LAN. Typically, this also means that there is no additional overhead interspersed within the data packet. In one embodiment, an interface device having ATM cell processing capability may be operated in a mode which "bypasses" the ATM cell processing capability, such that the raw data is provided by the interface device. For example, the raw data capability may be invoked by selecting a test or diagnostic mode of the SONET framer/deframer 82 (bypassing the ATM processing).

A data formatter 84 is coupled between the framer/deframer 82 and LAN media access controller 86. The controller 86 provides an interface to the appropriate LAN, for example LAN A or LAN B shown in FIG. 7.

Figure 9:
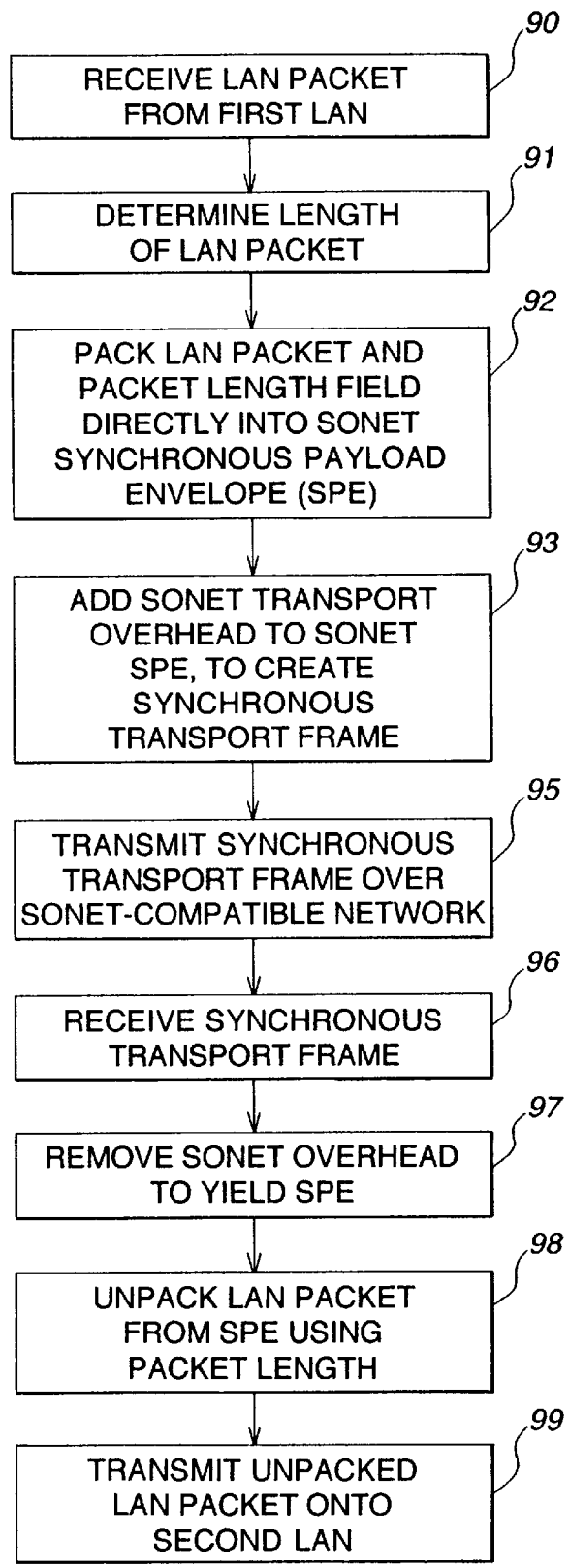
FIG. 9 is a flow diagram of process steps for transmitting a LAN packet from one LAN network to another LAN network across a SONET network, which may be performed by the elements of the block diagram of FIG. 8.

FIG. 9 shows the process steps by which a LAN packet is transmitted from a first LAN to a second LAN. In step 90, the LAN packet is received from the first LAN. In step 91, the length of the LAN packet is determined, so that ultimately the LAN packet may be unpacked on the receiving end. Such packet length may be defined as a number of eight-bit bytes, but may also be defined as a number of bits, or a number of 16-bit words. The LAN packet may be one from an ethernet, FDDI, token ring, or other protocol. In step 92, the LAN packet and a packet length field are packed directly into a SONET synchronous payload envelope (SPE). In step 93, SONET transport overhead is appended to the SONET SPE to create a synchronous transport frame. By using a packet length field, it is not necessary to include delimiters indicative of the end of packet and beginning of packet, which would typically be included if the packet were encapsulated within another format, such as the HDLC format. HDLC encapsulation would require significantly more overhead.

In step 95, the synchronous transport frame is transmitted over a SONET-compatible network. The synchronous transport frame is received, and the SONET transport overhead is then removed (step 96) to yield the synchronous payload envelope SPE (step 97). Because the SPE includes a packet length field, the bytes of the LAN packet may be unpacked from the SPE by unpacking the appropriate number of bytes as determined by the packet length field (step 98). The unpacked LAN packet is then transmitted onto the second LAN (step 99).

Figure 1:
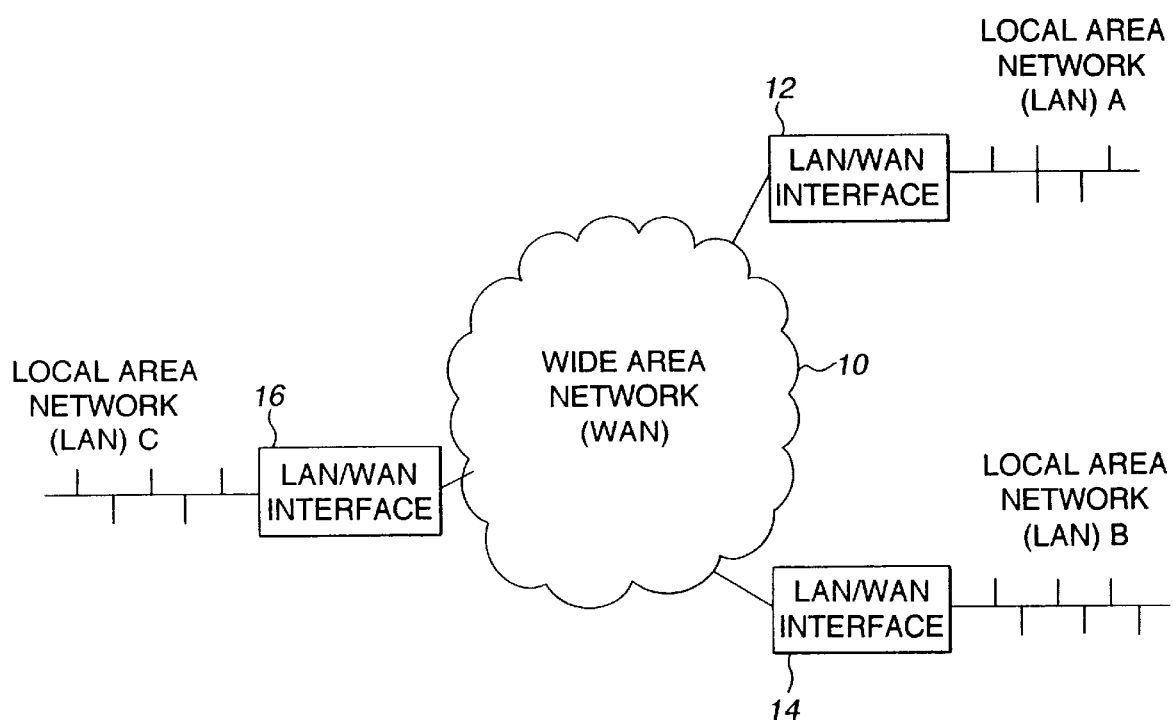
FIG. 1 is a schematic illustration of a wide area network (WAN) connecting several local area networks (LANs)
Figure 2:
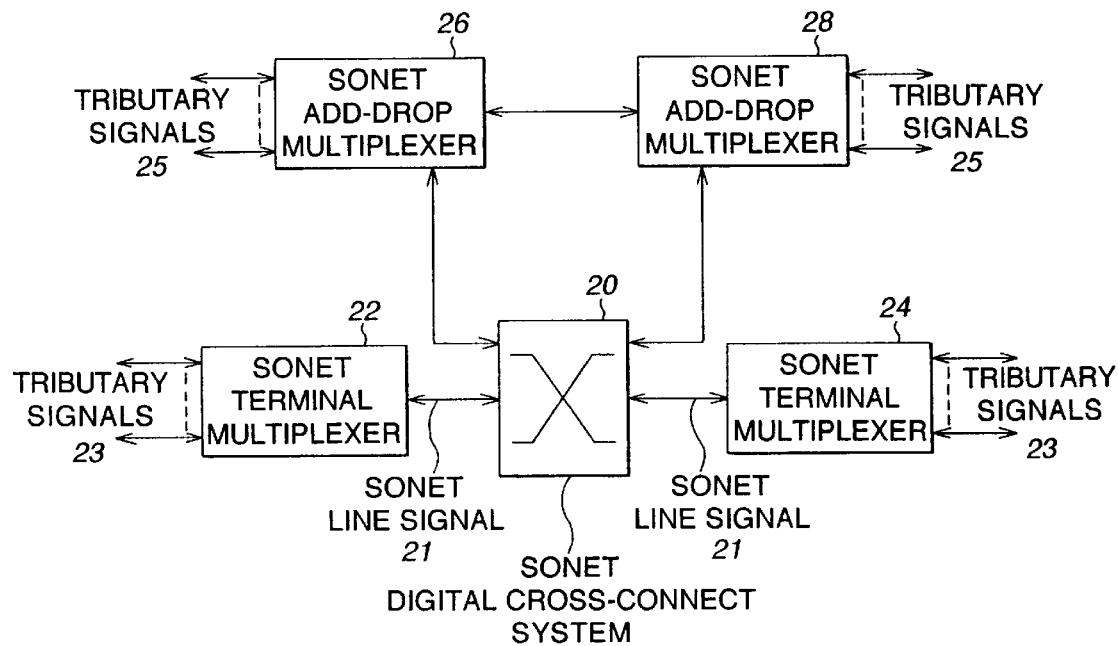
FIG. 2 is a block diagram showing elements of a SONET network.
Figure 3:
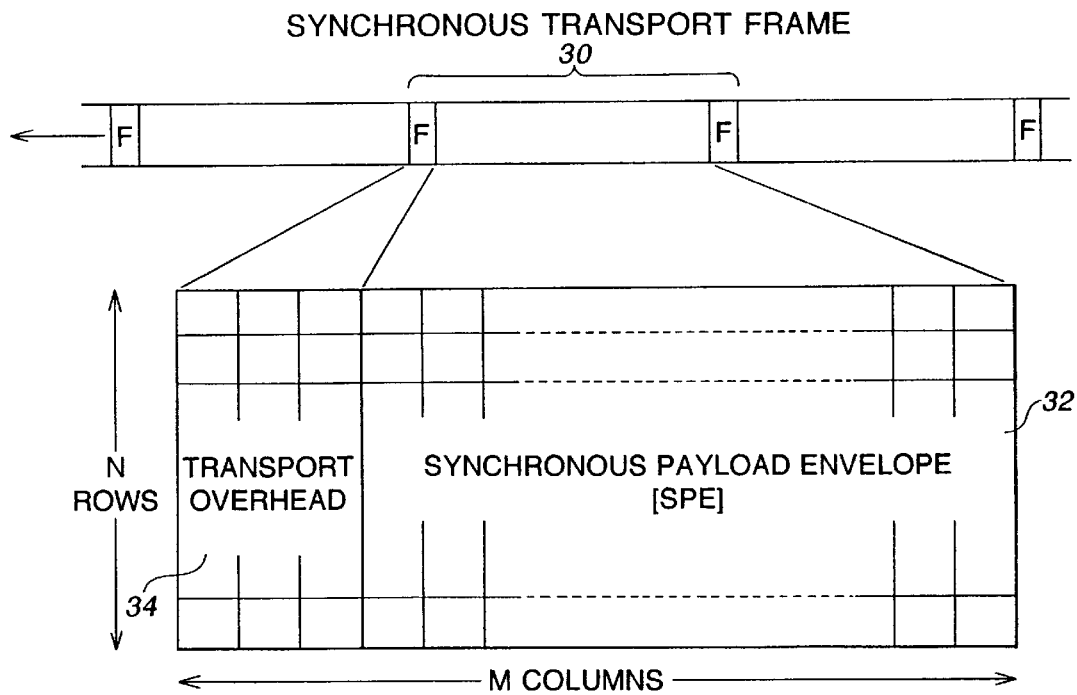
FIG. 3 depicts the contents of a synchronous transport frame, which is transmitted across a SONET network such as that shown in FIG. 2.
Figure 4:
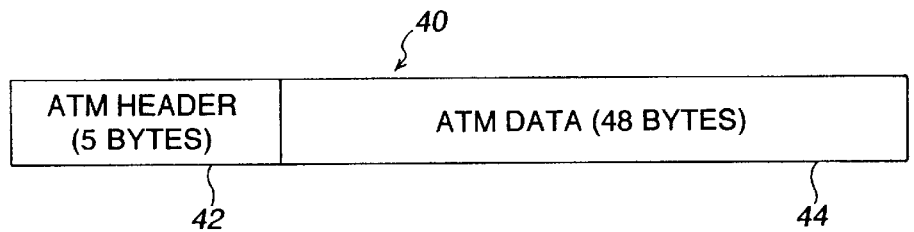
FIG. 4 depicts the contents of an ATM cell.
Figure 5:
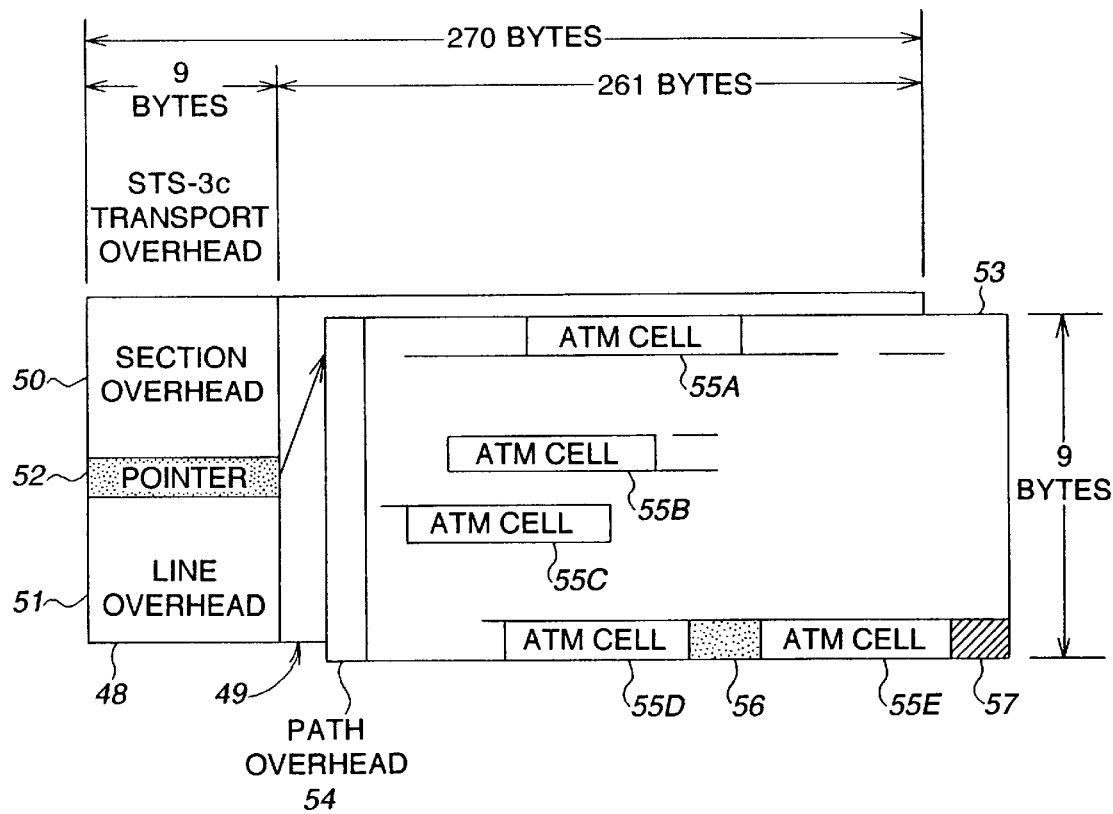
FIG. 5 illustrates an approach to packing ATM cells into a synchronous payload envelope (SPE) within a synchronous transport frame such as that shown in FIG. 3.
Figure 6:
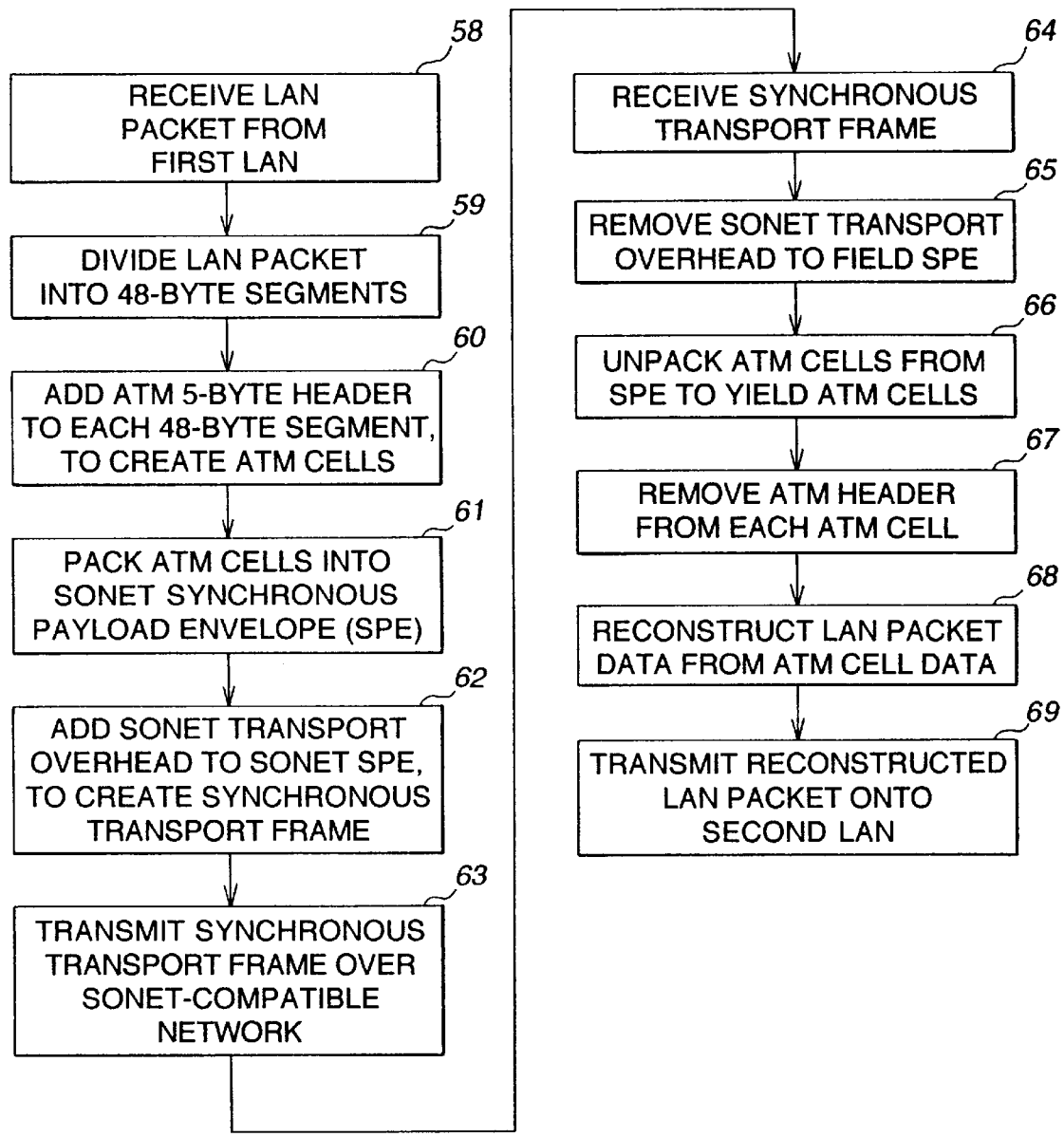
FIG. 6 is a flow diagram showing the known process steps required to transmit reformatted LAN data over a SONET network using the ATM standard.

As can be seen from a comparison of FIG. 9 and FIG. 6, there is much less overhead and many less steps in the present invention, as compared with the ATM approach. Because there is no fragmentation of the original packet, except perhaps between successive SPEs, higher transfer rates are achievable while using less computer resources and costs. Thus, transmitting a LAN data packet as a contiguous data stream contributes to more efficient communications.

Figure 10:
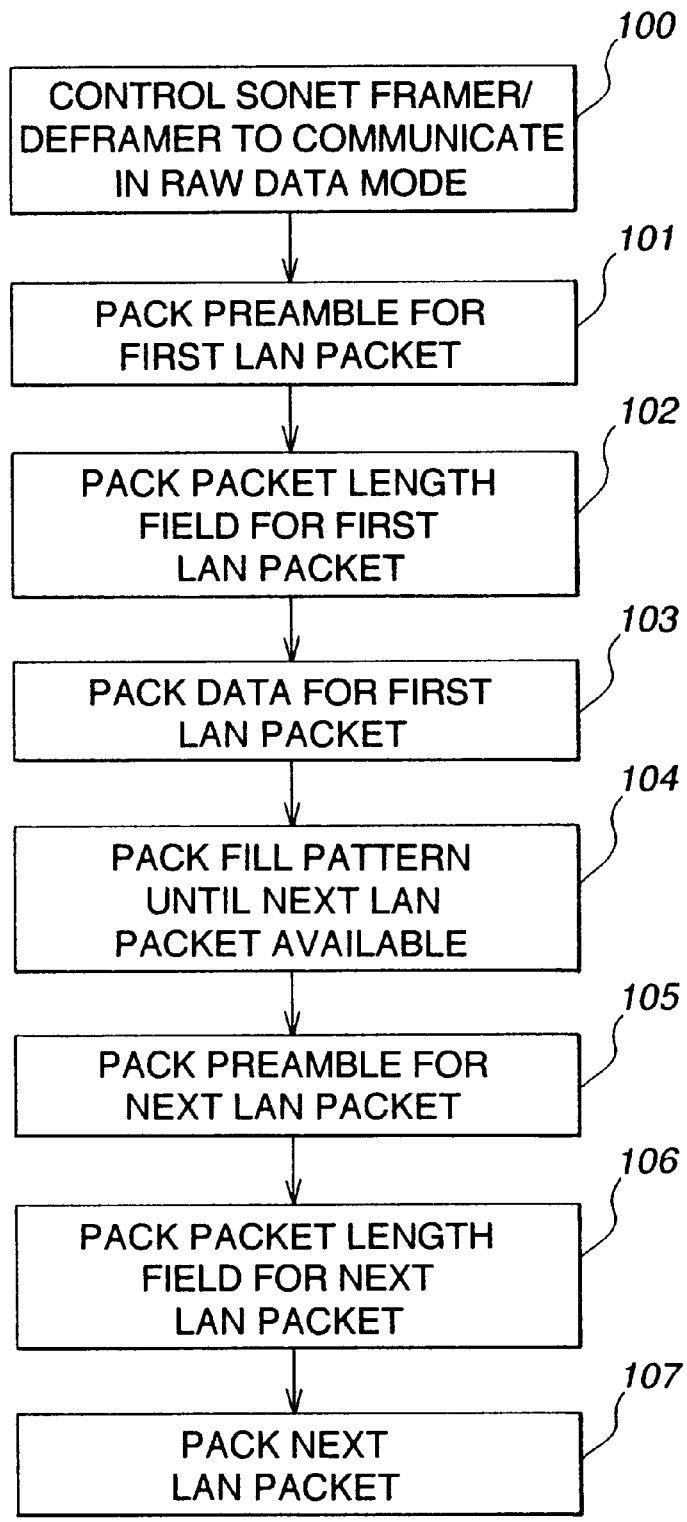
FIG. 10 illustrates more detail of one of the steps of FIG. 9, in which the LAN packet is packed directly into a SONET synchronous payload envelope (SPE) along with a packet length field.

FIG. 10 shows more detail of an exemplary embodiment of step 92 of FIG. 9, in which the LAN packet is packed directly into a synchronous payload envelope. In step 100, a SONET framer/deframer is controlled to communicate in a raw data mode. In step 101, the native preamble for a first LAN packet is packed into a SPE, followed by a packet length field for the first packet (step 102). Then, the data for the first LAN packet is packed (step 103). If there are no more LAN packets available at this time, a fill pattern is packed into the SPE and subsequent SPEs, until a next LAN packet is available (step 104). The fill pattern may be selected to be easily distinguishable from a LAN preamble, as will be discussed in more detail below. Once a next LAN packet is available, the preamble is packed (step 105), the packet length field is packed (step 106), and the next LAN packet data is packed (step 107).

Figure 11:
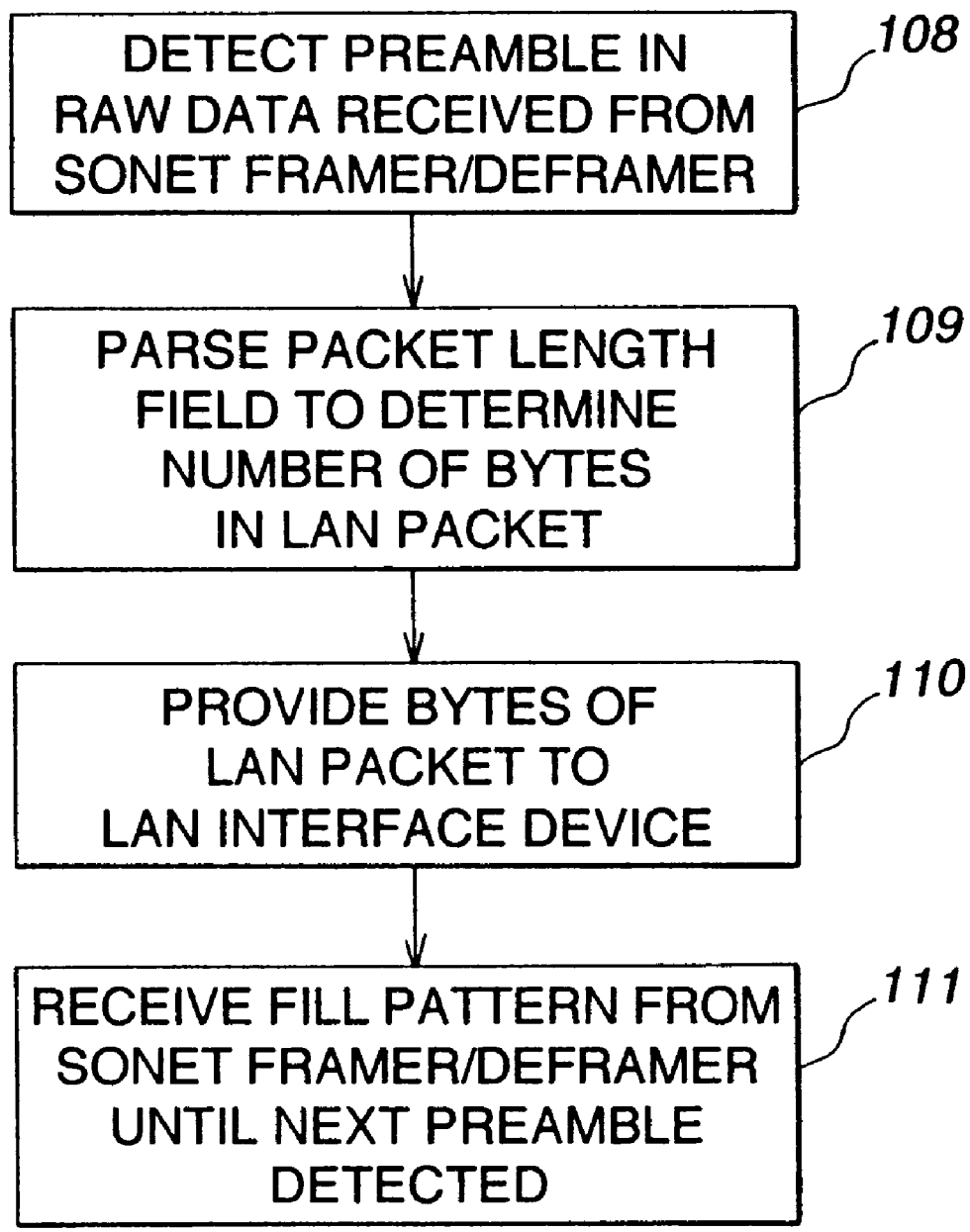
FIG. 11 illustrates more detail of the one step of FIG. 9, in which a LAN packet is unpacked from the SPE using information regarding the length of the LAN packet.

FIG. 11 is an exemplary embodiment of step 98 of FIG. 9, in which a LAN packet is unpacked from a synchronous payload envelope using information regarding the packet length. Because the SONET framer/deframer is operating in a raw data mode, there may not be a specific signal indicating that a new packet is being received. Therefore, in one embodiment of the invention, a native preamble is detected within the raw data that is received from the SONET framer/deframer (step 108). This preamble detection is usually performed by a device that is external to the SONET framer/deframer, so that the SONET framer/deframer is free to continue receiving the stream of raw data. Generally, a native (LAN) preamble includes alternating ones and zeros transmitted serially, but it is possible to use other sequences. After the preamble has been detected, the packet length field is provided from the SONET framer/deframer. Accordingly, in step 109, the packet length field is checked to determine the number of bytes in the LAN packet. Once the number of bytes in the LAN packet is known, the bytes may be provided to a LAN interface device (step 110). If a subsequent LAN packet is not transmitted immediately after a previous LAN packet, then a fill pattern may be received from the SONET framer/deframer until a next preamble is detected (step 111).

Figure 12:
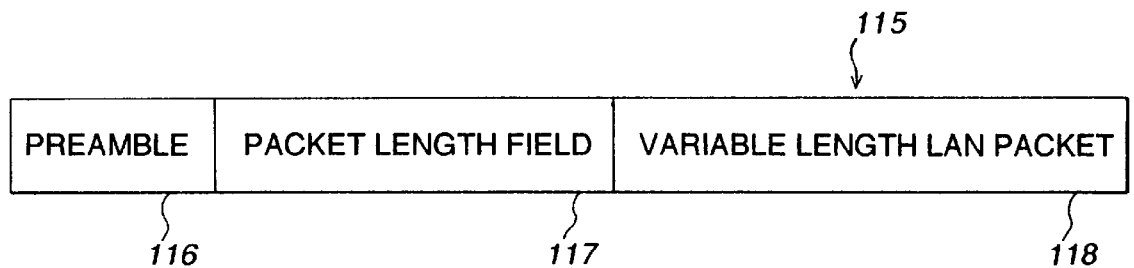
FIG. 12 shows a SONET frame in accordance with an embodiment of the present invention.

FIG. 12 shows one approach to formatting a variable length LAN packet into a modified form for direct transmission as raw data over a SONET network. The modified packet 115 includes a LAN preamble 116, packet length field 117, and variable length LAN data packet 118. In one embodiment, the preamble includes 8 bytes, the packet length field includes 2 bytes, and the variable length LAN data packet may include any number of bytes as determined by the packet length field 117.

Figure 13:
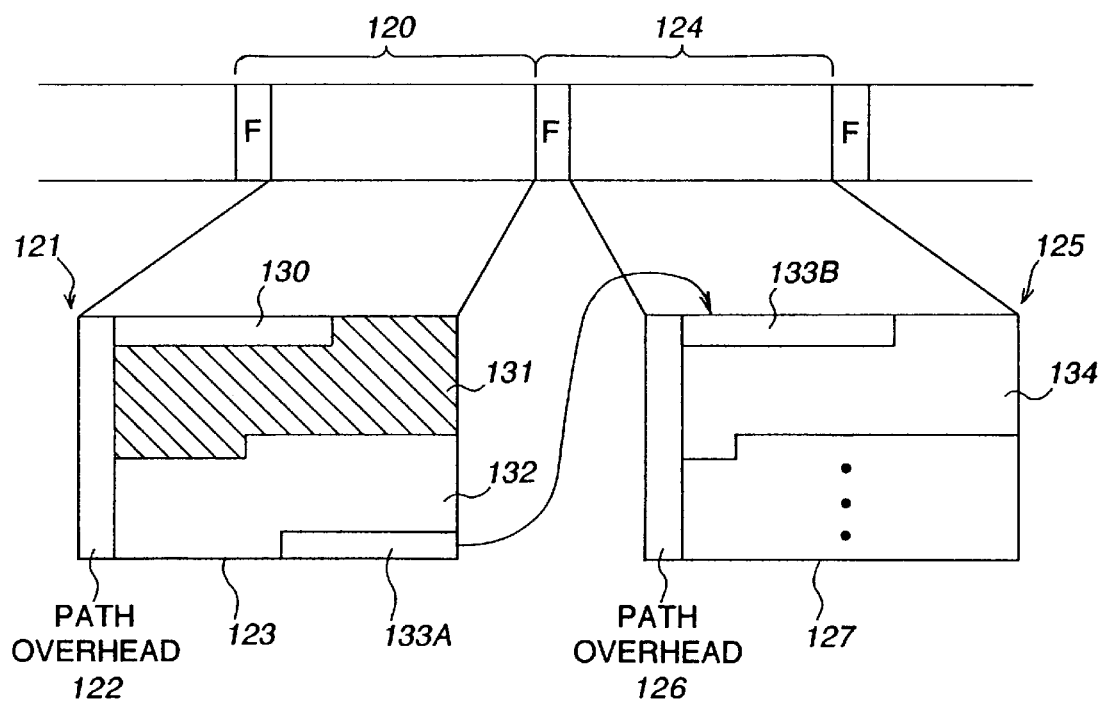
FIG. 13 shows a mapping of LAN packets onto SONET SPEs according to the invention.

FIG. 13 shows an example of how several modified LAN packets may be transmitted across a SONET network using a number of SPEs. For example, the SONET data stream may include a first synchronous transport frame 120, that includes a first SPE 121. The first SPE 121 includes path overhead 122 and data 123; data 123 is a combination of LAN data and fill data. For example, the first SPE 121 may include a first modified LAN packet 130, which is followed by fill data 131. This is an example of a case in which there was no data to transmit from a first LAN to a second LAN from the time that the first LAN packet 130 was sent until a second LAN packet is received. Following the fill data 131 is a second modified LAN packet 132, which is immediately followed by third modified LAN packet 133. In this example, because the third modified LAN packet 133 does not fit within the space still available in the SPE 121, only a first portion 133A of the third modified LAN packet is included within SPE 121.

Following the first synchronous transport frame 120 is a second synchronous transport frame 124, which includes a SPE 125 having path overhead 126 and data 127. The second SPE 125 includes a second portion 133B of the third modified LAN packet 133. No additional overhead is required to define this split between the first portion 133A and the second portion 133B because in the beginning of each modified LAN packet is the packet length field 117, which determines the length of the variable length LAN packet to follow. Thus, when the raw data is provided from the SONET framer/deframer, all that is required is to count the appropriate number of bytes to follow, even if these bytes are overlaid on two different synchronous payload envelopes, as shown in the example depicted in FIG. 13. Following the third modified LAN packet 133 is a fourth modified LAN packet 134.

Figures 14, 14A:
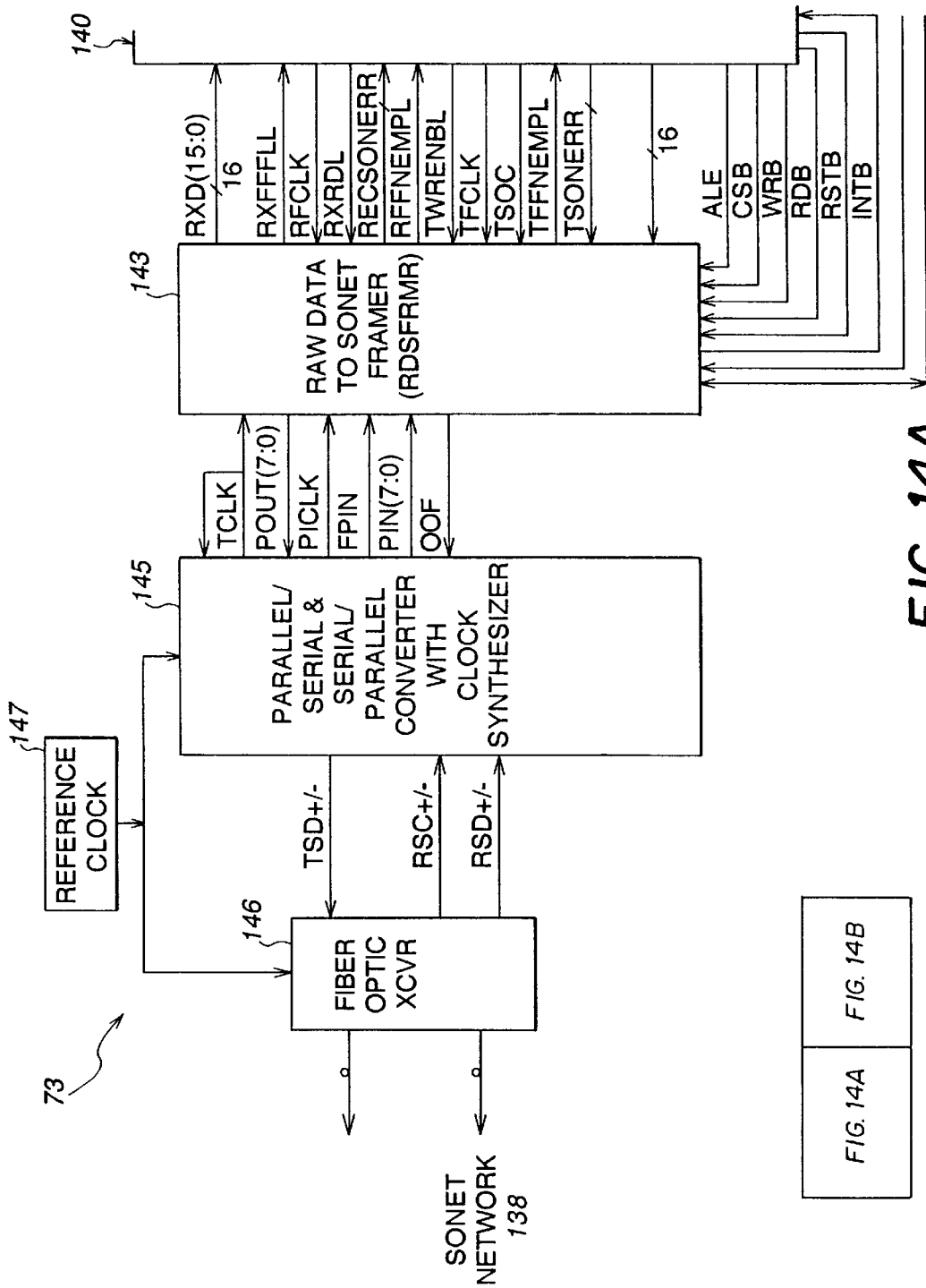
FIG. 14 is a detailed schematic diagram of one apparatus for implementing the invention.
Figure 14B:
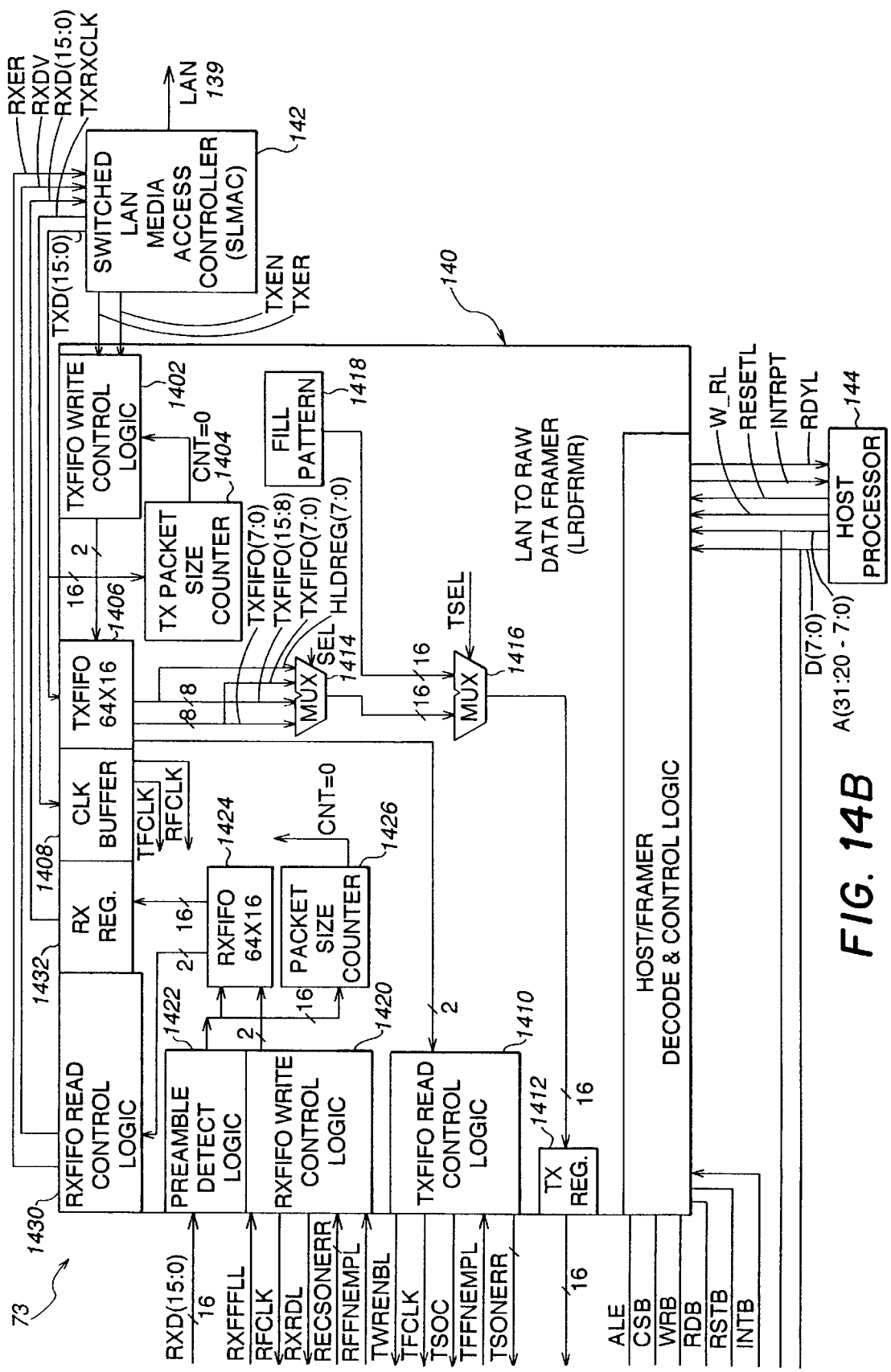

FIG. 14 is a detailed illustration of a SONET/LAN interface 73. In this embodiment, a "LAN to Raw Data/ Framer" (LRDFRMR) 140 provides an interface between a "Switched LAN Media Access Controller" (SLMAC) 142 and a "Raw Data to SONET Framer" (RDSFRMR) 143. The RDSFRMR 143 is further coupled to a "Parallel/Serial and Serial/Parallel Converter with Clock Synthesizer" 145, which is further coupled to "Fiber Optic Transceiver" 146 and "Reference Clock" 147. The transceiver 146 interfaces with a SONET network 138, while the SLMAC 142 interfaces with a LAN 139. Additionally, "Host Processor" 144 provides control functions to coordinate the functionality of several of the elements of FIG. 14.

In this embodiment, the RDSFRMR 143 is a 622 Mbits/ sec SONET Framer, Part No. PM5355, available from PMC-Sierra, Burnaby, British Columbia, Canada; the LRD-FRMR is a 20K field programmable gate array, Part No. A32200BX, available from Actel, Sunnyvale, Calif., U.S.A.; the Converter 145 is Part No. VCS8110, available from Vitesse, Camarillo, Calif., U.S.A.; and the Fiber Optic Transceiver 146 is Part No. HFBR5207, available from Hewlett-Packard, Burlington, Mass., U.S.A. The Host Processor 144 may be any general purpose processor, and the SLMAC 142 may be any device which provides appropriate interface with a LAN.

The LRDFRMR 140 may also be implemented as a processor, any combination of firmware or software, or may be embodied as an ASIC or combination of discrete elements. The components of the LRDFRMR 140 depicted in FIG. 14 are described below.

The Transmit FIFO Write Control Logic 1402 provides an interface with SLMAC 142 when data has been received from the LAN 139 by SLMAC 142. In particular, Transmit FIFO Write Control Logic 1402 interfaces with a Transmit Packet Size Counter 1404 and a Transmit FIFO 1406. The Transmit FIFO Write Control Logic 1402 utilizes a clock emanating from a Clock Buffer 1408, which receives clock signals from SLMAC 142.

The Transmit FIFO Read Control Logic 1410 provides data, that has been previously processed by the Transmit FIFO Write Control Logic 1402, to the RDSFRMR 143. Such data may be particularly provided by Transmit Register

1412. Multiplexer 1414 selects specific data from the Transmit FIFO 1406, and Multiplexer 1416 selects either data from the Transmit FIFO 1406 or fill pattern data from the Fill Pattern Data Generator 1418.

The Receive FIFO Write Control Logic 1420 provides control when data is received from the SONET network via the RDSFRMR 143. In particular, the Receive FIFO Write Control Logic 1420 controls the Preamble Detect Logic 1422, the Receive FIFO 1424, and the Receive Packet Size Counter 1426.

The Receive FIFO Read Control Logic 1430 then controls the Receive FIFO 1424, and the Receive Register 1432, to provide the received data to SLMAC 142.

Figure 15:
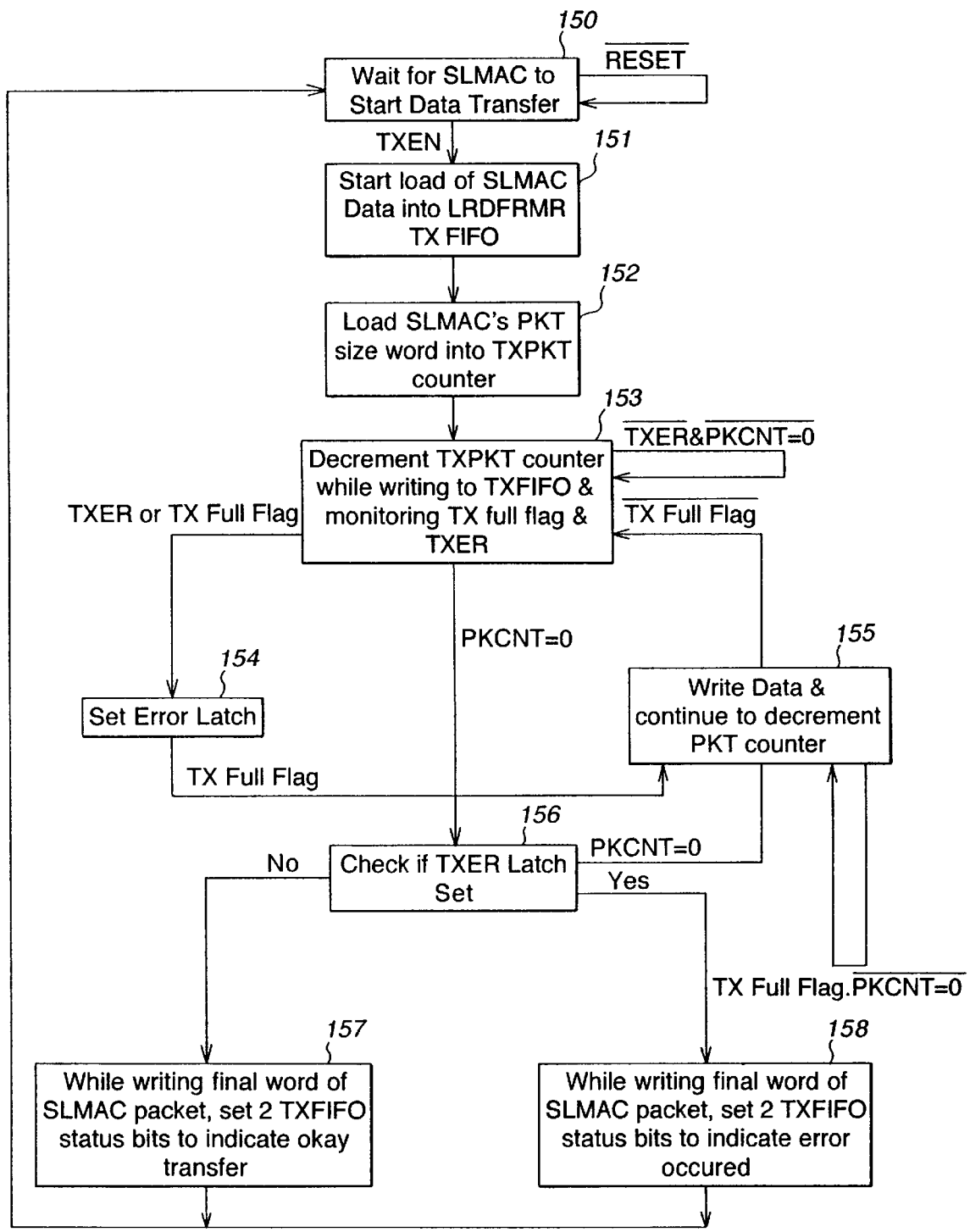
FIG. 15 is a flow process diagram of steps performed by the Transmit FIFO Write Control Logic (1402) of FIG. 14.

Exemplary operation of the structure depicted in FIG. 14 will be explained with respect to operation of each of the Control Logic Elements 1402, 1410, 1420, and 1430. In particular, FIG. 15 is a flow process diagram of steps performed by the Transmit FIFO Write Control Logic 1402. The process begins by waiting for the SLMAC 142 to start a data transfer (step 150). This may be determined as an initial state, by providing a reset signal. Upon receipt of a Transmit Enable Signal (TXEN) from the SLMAC 142, the Transmit FIFO Write Control Logic 1402 begins to load the data received from the LAN into the Transmit FIFO 1406, step 151. In one embodiment, the SLMAC 142 also provides an indication of the packet size of the LAN packet. Accordingly, in step 152, the packet size word received from the SLMAC 142 is loaded into the Transmit Packet Size Counter 1404. Alternatively, the packet length of a LAN packet may also be determined within the LRDFRMR 140.

In step 153, the Transmit Packet Size Counter 1404 is decremented while data is written to the Transmit FIFO 1406. Such operation would typically continue until the packet count reaches zero, indicated by PKT CNT=0. However, if there is a transmit error, or if the Transmit FIFO becomes full, the process may proceed to step 154 in which an Error Latch is set. Then, if the Transmit FIFO is full, step 155 shows that data is written even though the Transmit FIFO 1406 is full. In one embodiment, the data is actually discarded in step 155. From step 155, if the Transmit FIFO 1406 is not still full, then the process can proceed to step 153 again. Alternatively, if the packet count reaches zero prior to the Transmit FIFO 1406 becoming full, than the process proceeds to step 156.

In step 156, the Transmit Error Latch (TXER) is accessed to determine whether there was a transmit error. If there was no error, then in step 157, two bits of the Transmit FIFO may be set to indicate that the data transfer was successful. Alternatively, if there was a transmit error, then two bits from the Transmit FIFO may be set to indicate that an error occurred, step 158. After either step 157 or step 158, the process returns to step 150, in which the system awaits new data from the LAN via the SLMAC 142.

Figure 16:
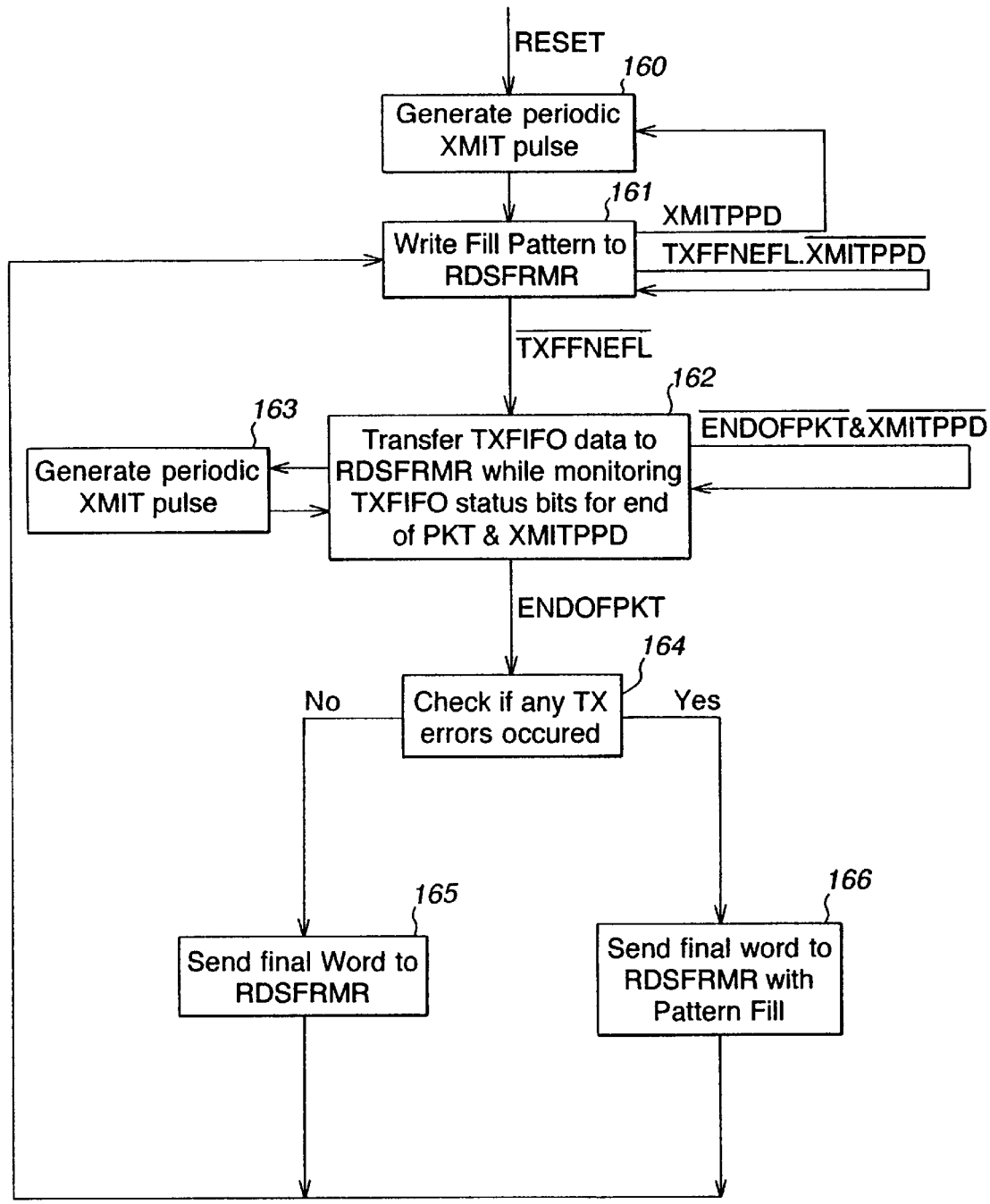
FIG. 16 is a flow process diagram of steps performed by the Transmit FIFO Read Control Logic (1410) of FIG. 14.

FIG. 16 depicts steps of a process performed by an embodiment of the Transmit FIFO Read Control Logic 1410. Following a reset, or upon initialization, a periodic transmit pulse is provided to the RDSFRMR 143 in step 160. The assertion of the periodic transmit pulse may be initiated in response to a timer signal such as Transmit Period (XMITPPD). If there is no LAN data to send, then the fill pattern from Fill Pattern Generator 1418 is provided to the RDSFRMR 143 via the Transmit Register 1412. This will cause the RDSFRMR 143 to provide a fill pattern in each successive SPE, as described previously. During step 161, the Transmit FIFO 1406 is monitored to determine whether it is full, as indicated by an assertion by signal TXFFNEFL (Transmit FIFO Not Full). During this time, the periodic transmit pulse is continually asserted, by returning the process to step 160. If the Transmit FIFO 1406 is not full, then the process continues to step 162, where the data within the Transmit FIFO 1406 is transferred to the RDSFRMR 143 via the Multiplexers 1414, 1416, and Transmit Register 1412.

During step 162, status bits of the Transmit FIFO 1406 are monitored to determine the end of the packet as indicated by signal ENDOFPKT. Additionally, during step 162, the periodic transmit pulse is also generated, step 163, to maintain the RDSFRMR 143 running in the raw data mode. At the end of the packet, the Transmit FIFO Read Control Logic 1410 checks to see if any transmit errors occurred (step 164). If no errors occurred, then the last word of the data packet is sent to the RDSFRMR (step 165). If there is an error, the fill pattern from the Fill Pattern Generator 1418 is sent to the RDSFRMR 143, as shown in step 166. After the final word is written in either step 165 or 166, then the process returns to step 161 which provides a fill pattern to the RDSFRMR 143.

Figure 17:
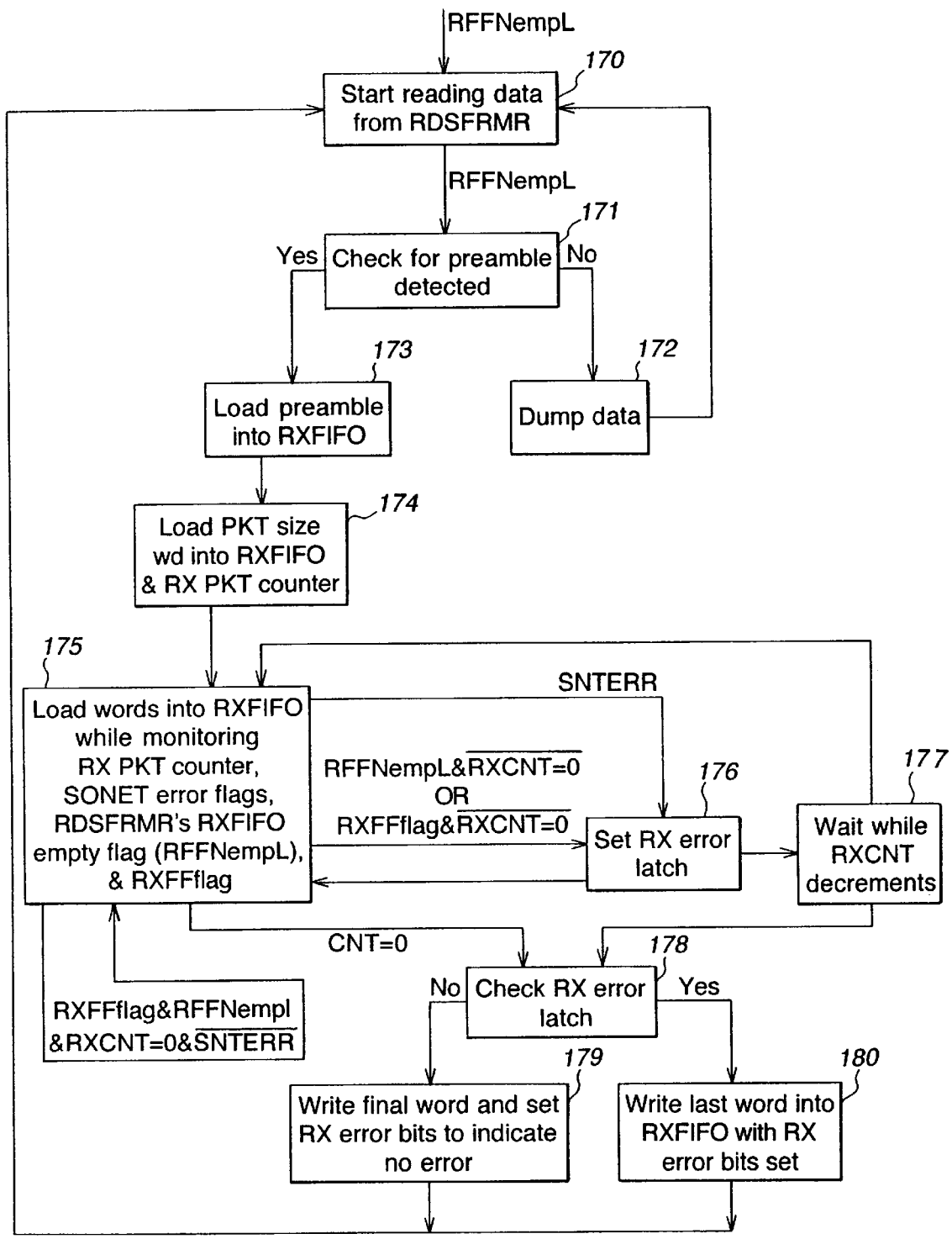
FIG. 17 is a flow process diagram of steps performed by the Receive FIFO Write Control Logic (1420) of FIG. 14.

FIG. 17 illustrates the process steps performed by the Receive FIFO Write Control Logic 1420, to receive data from the SONET network via RDSFRMR 143. The process begins when the RDSFRMR 143 provides an indication that it has data. For example, this may be indicated by the assertion of a Receive FIFO Not Empty Flag Signal (RFFNempL). At this point, as shown in step 170, data is read from the RDSFRMR 143. In step 171, the Preamble Detect Logic 1422 monitors the sequence of data being read to determine whether there is a preamble. If a preamble is not detected, then data may simply be discarded as shown in step 172. If, however, there is a preamble detected, then the process proceeds to step 173 in which the preamble is loaded into the Receive FIFO 1424. Additionally, the packet size word, previously referred to as Packet Length Field 117, is loaded into the Receive FIFO 1424, as well as the Packet Size Counter 1426, step 174.

In step 175, the words of the data received from the RDSFRMR 143 are loaded into the Receive FIFO 1424 while decrementing the contents of the Packet Size Counter 1426 and monitoring if it has expired to a count of zero, which indicates the end of the packet has been reached. In this example, the data is received from the RDSFRMR 143 as 16-bit words. Various error indications may also be monitored during step 175. For example, any error flags provided by the RDSFRMR may be monitored. Additionally, the Receive FIFO Empty Flag of the RDSFRMR may be monitored (RFFNempL), as well as the full flag of the Receive FIFO 1424 (RXFFflag). If either of these FIFO flags are set, then the process may proceed to step 176, in which a Receive Error Latch is set, and then to step 177, in which the process waits until the contents of the Packet Size Counter 1426 decrements. Once there is no more data to be loaded, as indicated by the contents of the Packet Size Counter 1426 being equal to zero, the Receive Error Latch is checked to determine whether an error has occurred (step 178). If no error has occurred, then the last word may be written to the Receive FIFO 1424, including setting error bits to indicate that no error occurred. Alternatively, if an error has occurred, then the last word may be written into the Receive FIFO 1424 with error bits set to indicate that an error has occurred. From either step 179 or 180, the process proceeds back to step 170.

Figure 18:
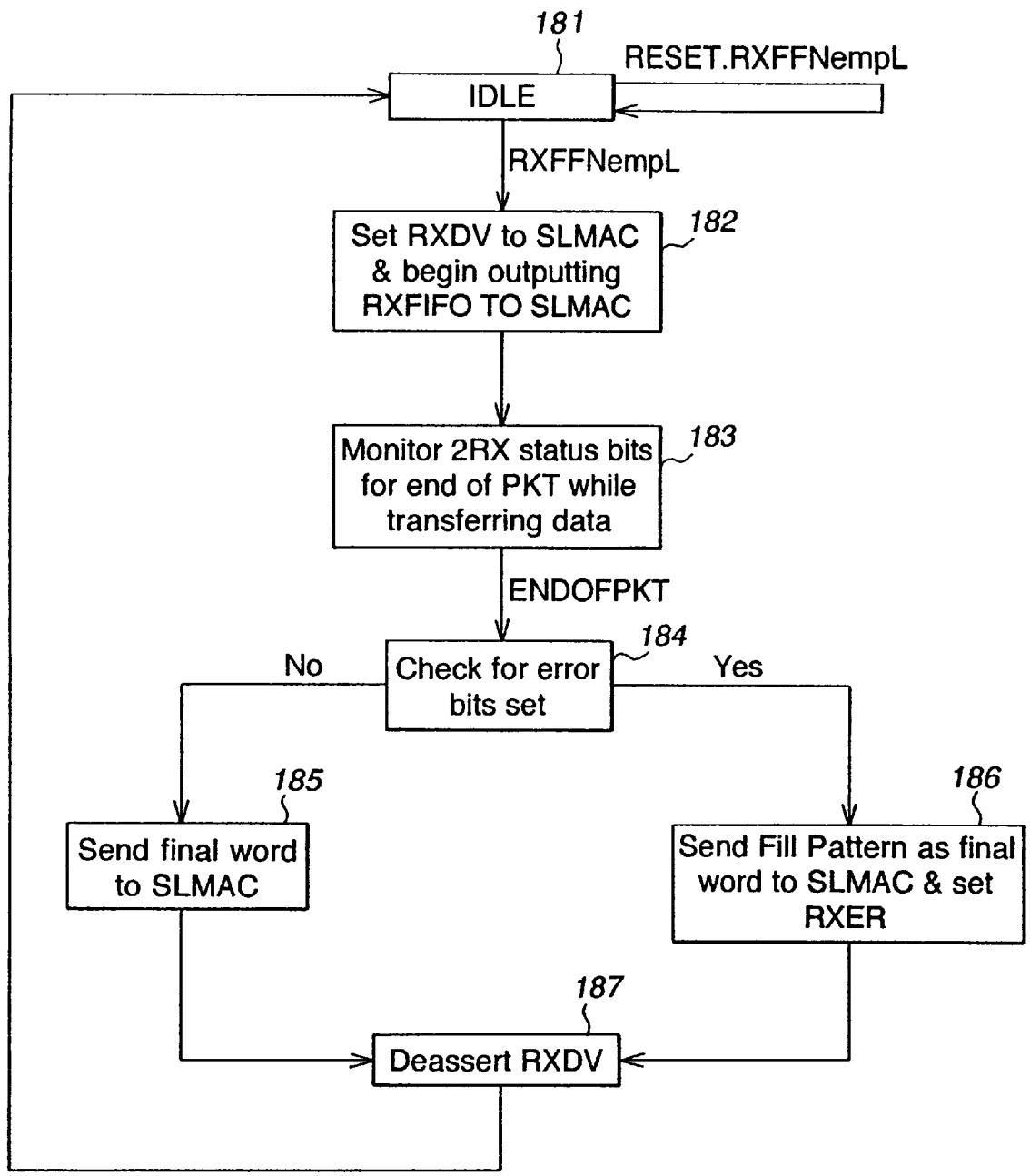
FIG. 18 is a flow process diagram of steps performed by the Receive FIFO Read Control Logic (1430) of FIG. 14.

FIG. 18 shows the process steps performed by the Receive FIFO Read Control Logic 1430. Initially, as shown in step 181, the process is idle until a signal is received indicating that the Receive FIFO is not empty (RXFFNEMPL). Once such a signal is received, in step 182, a signal may be provided to the SLMAC 142 to indicate that there is valid data which is being received from the RDSFRMR 143 by the LRDFRMR 140. In the example shown in FIG. 14, this is the Signal RXDV. Also, during step 182, the data which is in the Receive FIFO 1424 is provided to the SLMAC 142 via the Receive Register 1432. As indicted with respect to FIG. 17, the Receive FIFO 1424 may contain error bits indicating whether an error has occurred during the reception of data from the RDSFRMR 143. Accordingly, these error bits are checked in step 184. If there is no error, than in step 185 the final word of the data packet is sent to the SLMAC. Alternatively, if there was an error bit set, then a fill pattern may instead be sent to the SLMAC and a Receive Error Signal may be inserted (RXER) to the SLMAC 142, as shown in step 186. Following either step 185 or 195, the Receive Data Valid Signal RXDV may be deasserted.

As described above, some SONET Framers/Deframers may provide a native format transmit capability, as well as other transmit capabilities (e.g., ATM cell framing). In a particular embodiment that implements the SONET Framer/ Deframer as PMC-Sierra Part No. PM5355, an option is provided in which ATM cell processing is disabled and raw data is either inserted or extracted to or from the SONET payload. To use the PM5355 in this mode, several register bits may be set to the respective values shown below:

| Bits | Reg. # | Register Name | Value |
|---|---|---|---|
| CDDIS | 0x5C | RACP GFC/Misc. Control | 1 |
| HCSADD | 0x50 | RACP Control | 0 |
| HCSPASS | 0x50 | RACP Control | 1 |
| HCSB | 0x60 | TACP Control | 1 |
| HCSADD | 0x60 | TACP Control | 0 |
| HCSPASS | 0x60 | TACP Control | 1 |
| PASS | 0x50 | RACP Control | 1 |

Such functionality may also be designed into a single ASIC which encompasses the functionality of the RDS-FRMR 143 and the LRDFRMR 140 shown in FIG. 14. Similarly, the functions described above may be allocated to any of several architectural elements and combinations of hardware, software and firmware. For example, all or any portion of the functionality described with respect to FIG. 14 may be implemented as a general purpose processor which runs software to provide such functionality.

Figure 19:
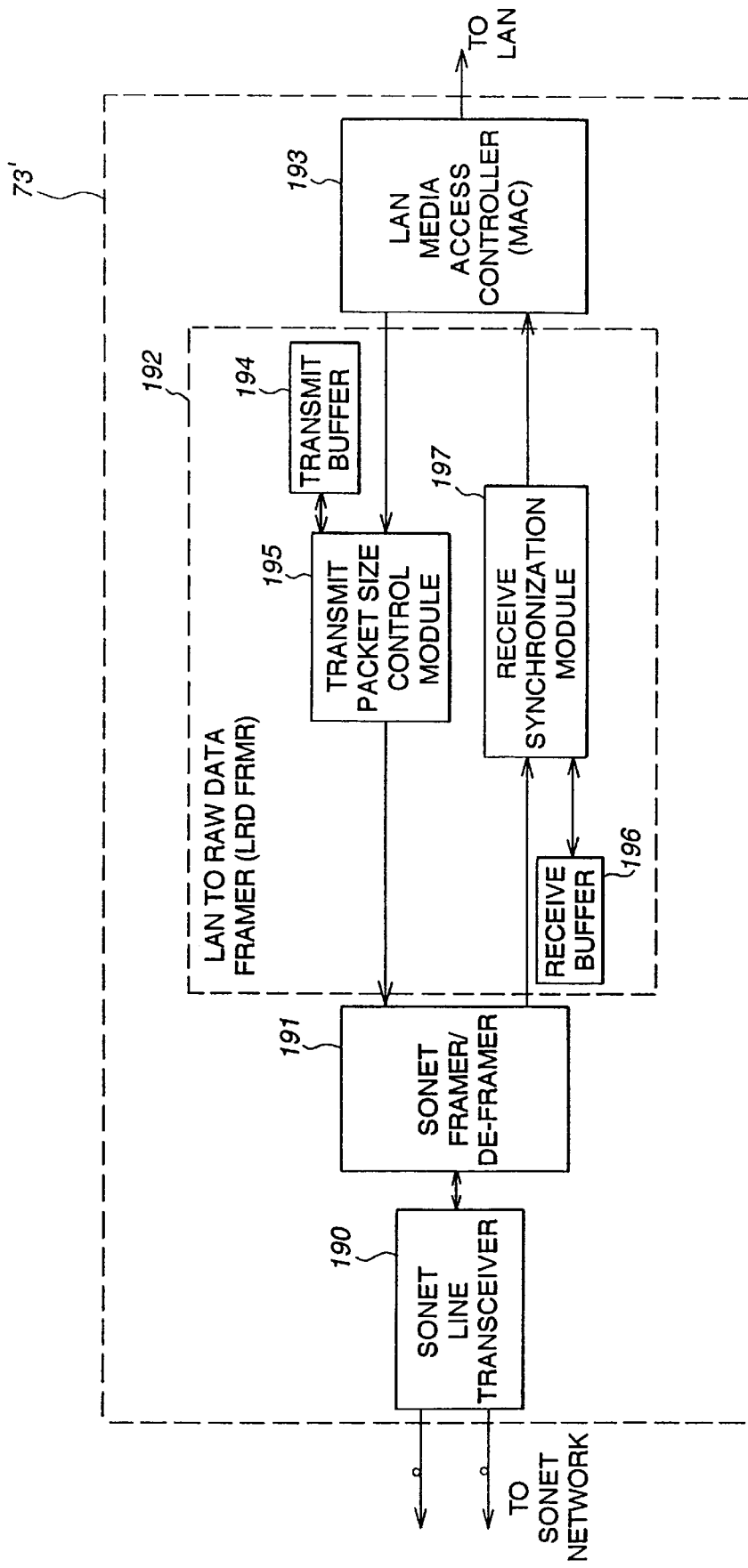
FIG. 19 is a block diagram of another embodiment of the invention.

FIG. 19 illustrates another embodiment of the invention, in which a data framer 192 determines the packet size of a packet to be transmitted, so that this function need not be performed by a media access controller. As with the earlier examples, the packet size may be defined in one embodiment as a number of bytes. As illustrated in FIG. 19, the data framer 192 also provides synchronization between a SONET framer/deframer 191 and a media access controller 193, so that these two devices may operate asynchronously and at different speeds.

FIG. 19 depicts more detail of this alternative SONET/ LAN INTERFACE 73' (similar to interface 73 in FIG. 8). A SONET line transceiver 190 provides a physical interface with the SONET network. Coupled to the transceiver 190 is a SONET framer/deframer 191. At the opposite end, a LAN media access controller (MAC) 193 has one interface coupled to the LAN. "LAN to raw data framer" (LRDFRMR) 192 provides the interface between the framer/ deframer 191 and the MAC controller 193.

In this embodiment, LRDFRMR 192 includes a transmit buffer 194 and transmit packet size control module 195. The control module 195 receives a LAN packet from MAC controller 193, and transmits the packet to buffer 194 where it is stored. The control module 195 determines the size of the LAN packet once it has been completely stored in buffer 194. Such a feature eliminates a need for the MAC controller 193 to determine the size of the LAN packet and to append the packet length field to the LAN packet. LRDFRMR 192 also includes a receive buffer 196 that receives SONET packets from the SONET framer/deframer 191, via receive synchronization module 197. In the event that the SONET framer/deframer 191 and the MAC controller 193 operate asynchronously or at different speeds, the receive buffer 196 stores at least a portion of the SONET packet prior to it being passed to the MAC controller 193, so that module 197 may provide the received packet at the appropriate speed and time to the MAC controller 193.

Figure 20:
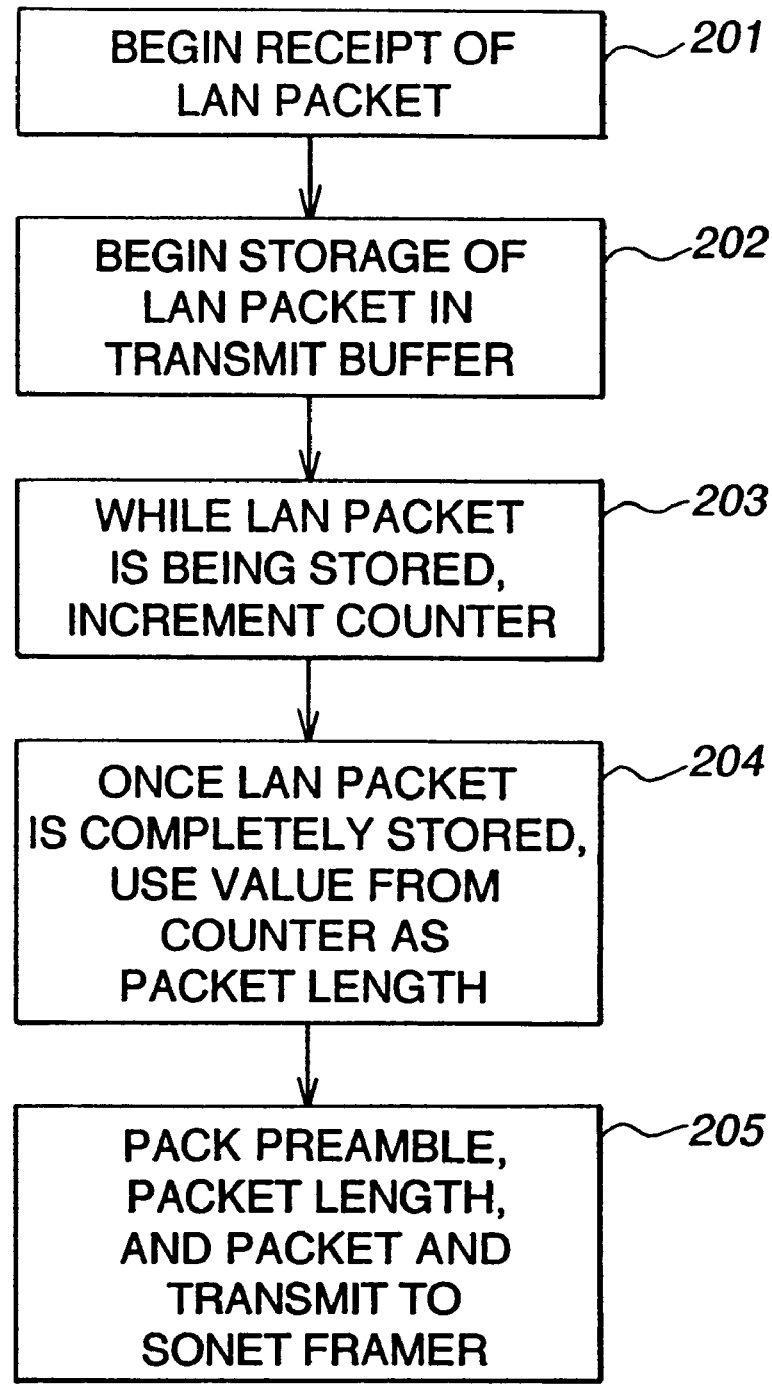
FIG. 20 is a flow process diagram of steps performed by the apparatus illustrated in FIG. 19 when transmitting data to a SONET WAN.

FIG. 20 is a process flow diagram of transmit mode operation of LRDFRMR 192. In step 201, LRDFRMR 192 begins receipt of a LAN packet from the MAC controller 193. In step 202, LRDFRMR 192 begins storage of the LAN packet into the transmit buffer 194. While the LAN packet is being stored in buffer 194, a counter is incremented (step 203). In one embodiment, MAC controller 193 generates a transmit enable signal TXEN while sending the LAN packet. While this signal is asserted data from the MAC 193 is stored in the buffer 194, and the control module 195 increments the counter to monitor the size of the LAN packet being stored. Once the LAN packet has been completely stored in buffer 194 (which may be indicated by the TXEN signal being de-asserted), the counter value may be used as the packet length (step 204). Once the packet length has been determined, a preamble, packet length and the LAN packet data itself may be transmitted to the SONET framer/ deframer 191 (step 205).

Figure 21:
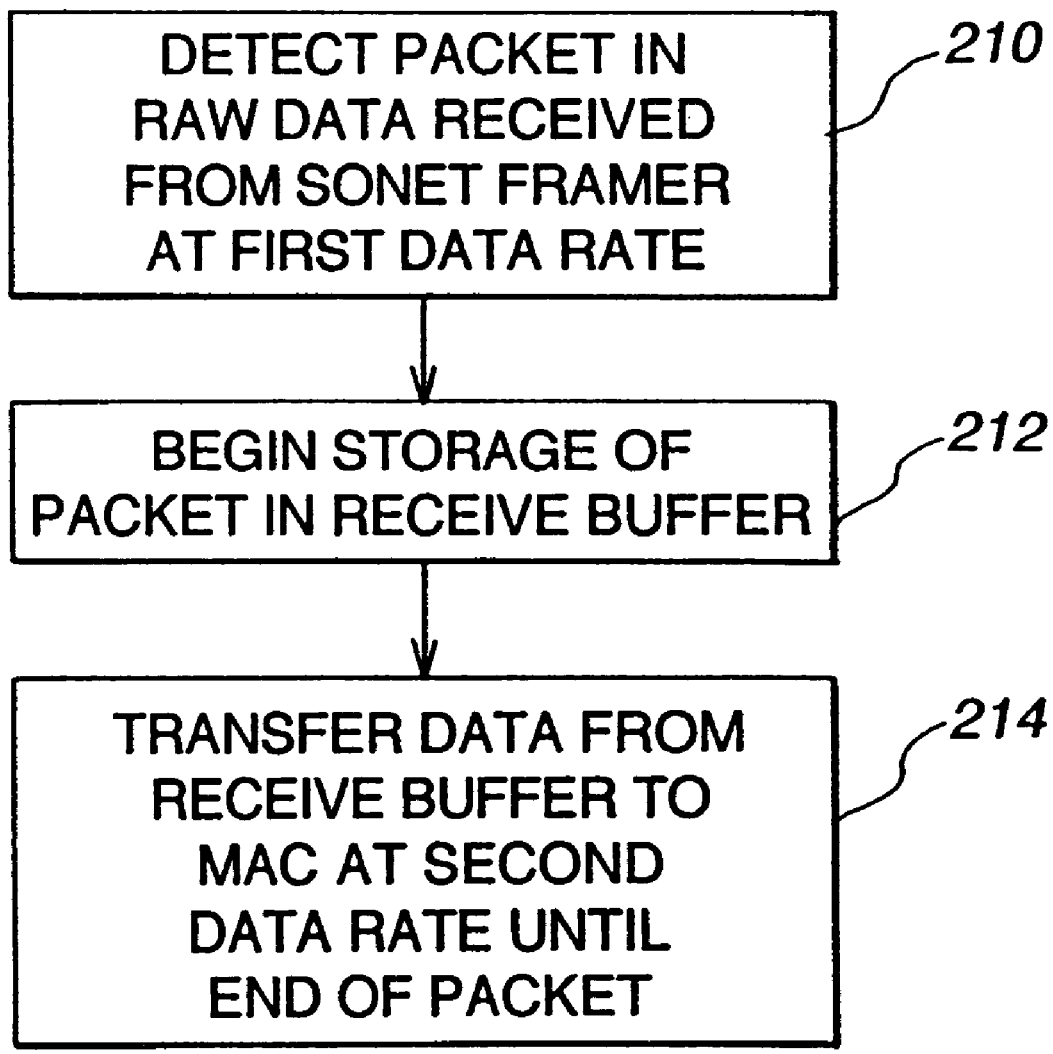
FIG. 21 is a flow process diagram of steps performed by the apparatus illustrated in FIG. 19 when receiving data from a SONET WAN.

Operation in the receive mode of the LRDFRMR 192 is illustrated in FIG. 21. In step 210, the receive synchronization module 197 detects a SONET packet in the raw data that is received from the SONET framer/deframer 191. In one embodiment, the SONET data rate is 155.52 bits/sec, which yields an effective rate of 19.44 Mbytes/sec at a continuous rate. However, the effective data rate which an exemplary MAC controller may receive data is only 12.5 Mbytes/sec. Therefore, it may be advantageous to provide a buffering mechanism such as buffer 196 to allow for this data rate difference. Thus, in step 210, the SONET packet in the raw data is received from the SONET framer/deframer 191 at a first data rate. In step 212, the receive synchronization module 197 begins storing the packet in the receive buffer 196 as the data is being received from the SONET framer 191. As with earlier embodiments, the detection of the packet may be performed by a preamble detector. In step 214, the synchronization module 197 transfers data from the receive buffer 196 to the MAC controller 193 at a second data rate that is compatible with the MAC controller 193, until all of the packet is transmitted.

In one illustrative embodiment, the SONET framer/ deframer 191 is a PMC Sierra device (Part No. PM5347), each of the transmit buffer 194 and the receive buffer 196 is a 4K×8 First In, First Out (FIFO), and the transmit packet size control module 195 and the receive synchronization module 197 are both implemented within an Actel one-time field programmable gate array (FPGA) with 20,000 gates (Part No. 32200 DX-1). With FIFOs of this size, this embodiment can support packet lengths of 4096 bytes of Fast Ethernet packets (100 M/bytes/sec) over a SONET STS 3-C fiber at 155 Mbytes/sec.

Figure 22A:
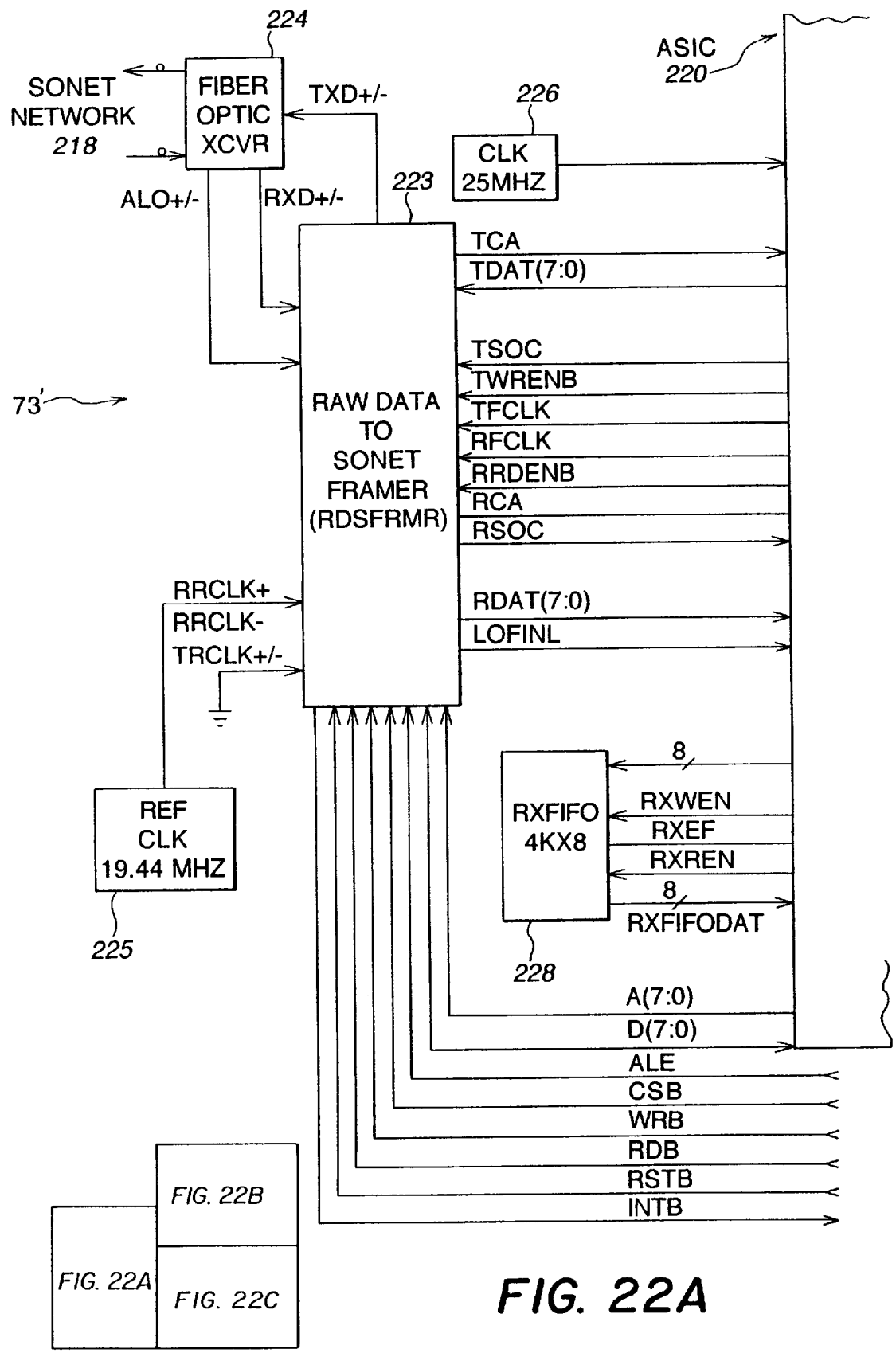
FIG. 22 is a detailed schematic diagram of one embodiment of the invention as shown in FIG. 19.
Figure 22B:
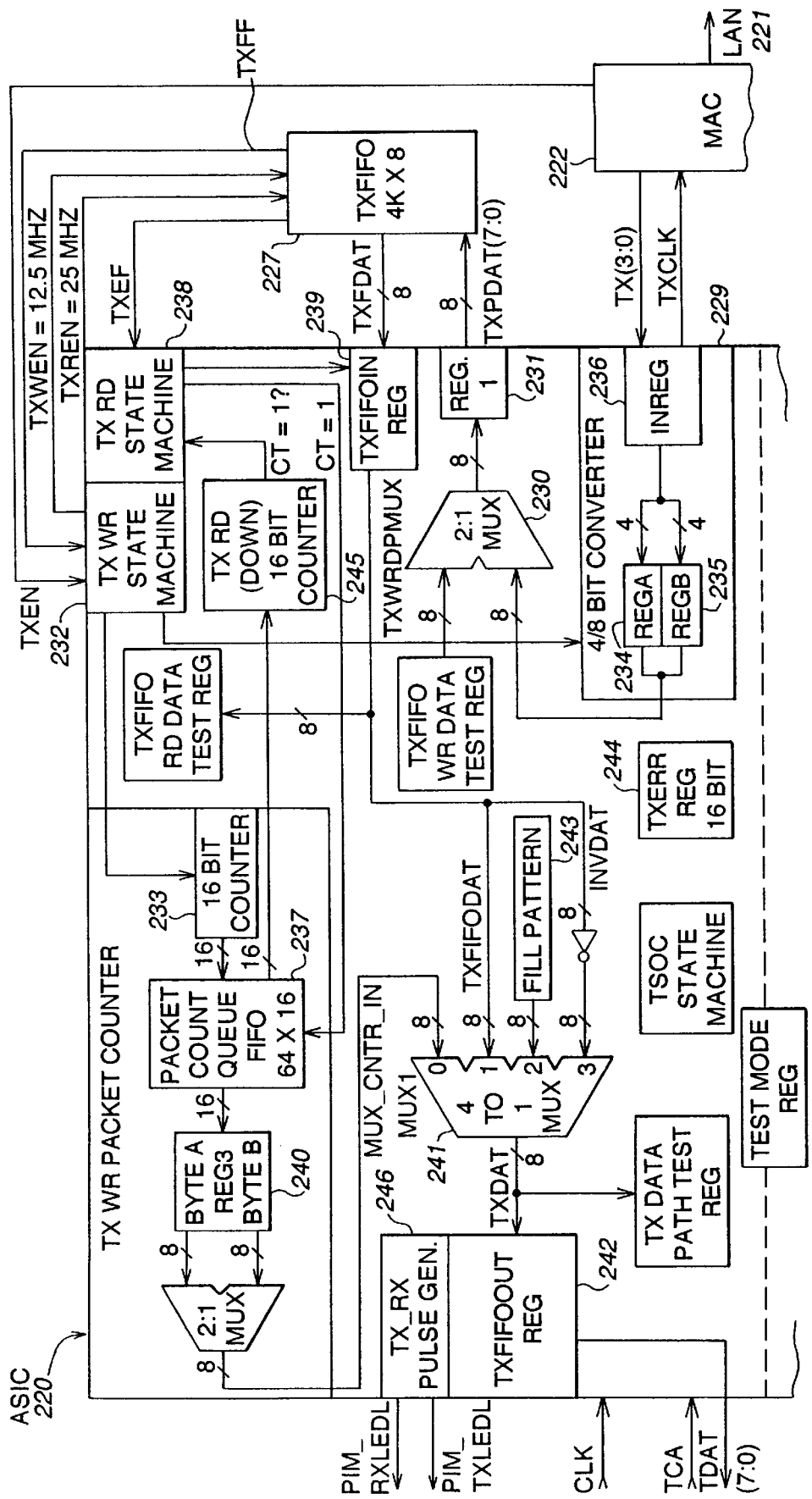
Figure 22C:
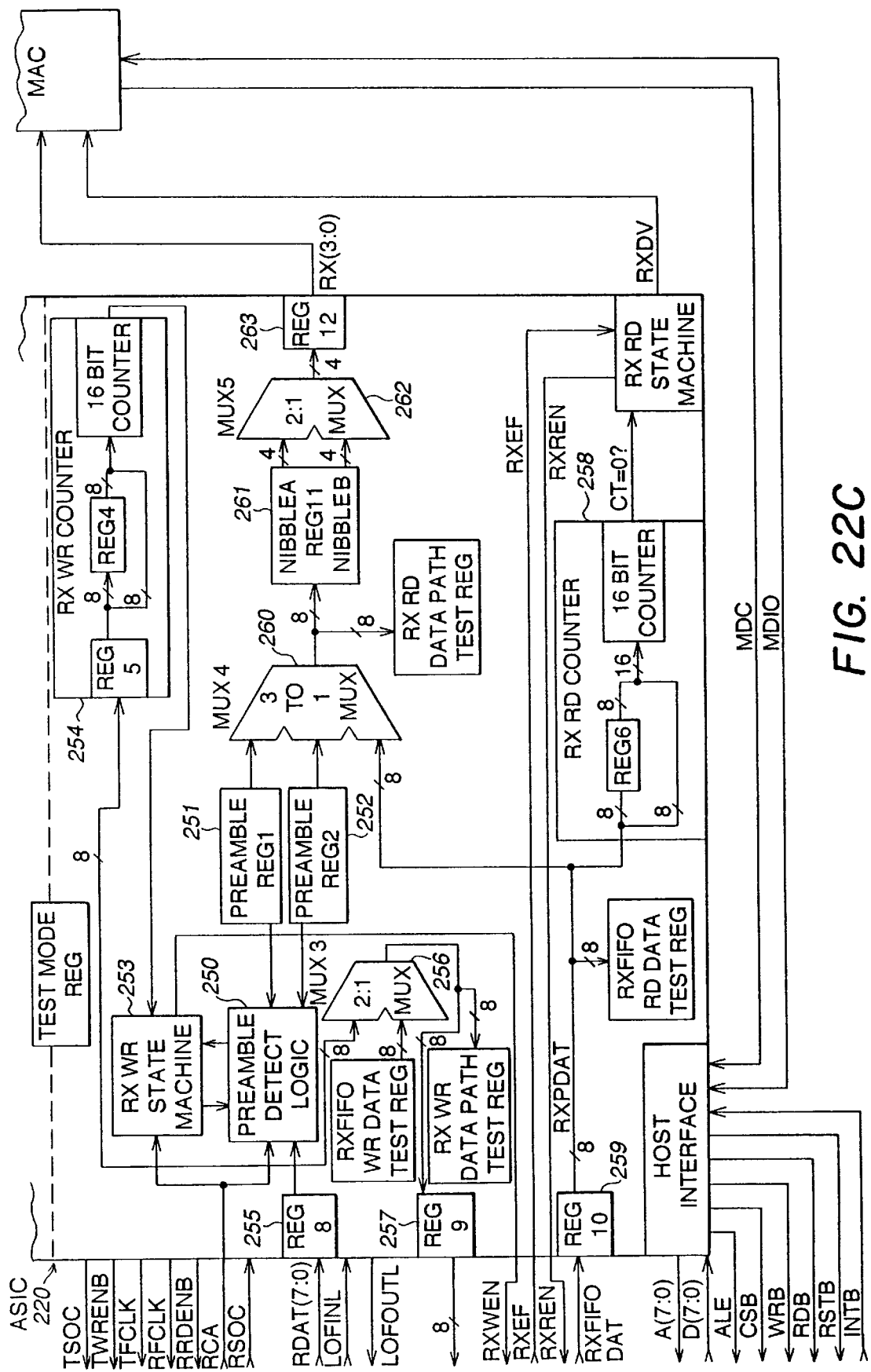

FIG. 22 is a detailed illustration of the alternative SONET/LAN interface 73'; in particular, detail is provided regarding a FPGA or ASIC (Application Specific Integrated Circuit) embodiment of the transmit packet size control module 195 and the receive synchronization module 197 of FIG. 19.

In this embodiment, an ASIC 220 provides an interface between a MAC controller 222, which is also coupled to a LAN 221, and a "Raw Data to SONET Framer" (RDSFRMR) 223. The ASIC 220 referred to herein may be implemented as an FPGA or an ASIC, or as a combination of discrete devices. In at least one embodiment it is implemented as a one-time programmable FPGA. In another embodiment, it is implemented as a re-programmable FPGA and is further coupled to a non-volatile memory device and circuitry to program the re-programmable FPGA from the memory device upon power up of the circuit.

The RDSFRMR 223 is further coupled to a fiber optic transceiver 224, which provides an interface to the SONET network 218. A reference clock 225 is also coupled to the RDSFRMR 223, and provides a 19.44 MHz reference. Additionally, a second reference clock 226 provides a 25 MHz reference to the ASIC 220. In this embodiment, a 4K×8 transmit FIFO (TXFIFO 227) provides the functions of the transmit buffer 194 of FIG. 19, and a 4K×8 receives FIFO (RXFIFO 228) provides the functions of the receive buffer 196 from FIG. 19.

As with earlier embodiments, the functionality shown in FIG. 19 may alternatively be provided by discrete circuitry, by software modules operating on a general purpose or a special purpose computer, or any combination thereof.

In operation, a 4/8-bit Converter 229 within ASIC 220 receives LAN packets from the MAC controller 222, and provides this data through the Multiplexer TXWRDPMUX 230 and register REG 1 (231) to the transmit FIFO 227. While the packet is being loaded, the transmit right (TX WR) state machine 232 controls a 16-bit counter 233 to increment while the packet is still being stored (i.e., while transmit enable TXEN is asserted). The 4/8-bit Converter 229 also translates the 4-bit nibbles received from MAC controller 222 into 8-bit bytes using register A (234), register B (235), and input register INREG (236). Once the data is loaded, the value in the 16-bit counter 233 is stored in a packet count queue FIFO 237, and also in the transmit read (TX RD) state machine 238 which controls the transmit FIFO input register (TXFIFOIN) 239 to provide synchronization between the transmit FIFO 227 and the RDSFRMR 223. Additionally, register REG 3 (240) stores the value indicative of the packet length, so that a packet length field may be provided to the RDSFRMR through the MUX 1 (241) and transmit FIFO output register (TX FIFOOUT REG) 242. Multiplexer MUX 1 (241) also provides the packet data from the transmit FIFO 227 via the transmit FIFO input register 239 and also provides a fill pattern from the fill pattern register 243 when desirable.

Additionally, if an error is detected in the data stored in the transmit FIFO 242, then a bit may be set in a transmit error register (TXERR REG) 244, which in turn controls the multiplexer MUX 1 (241), to receive inverted data for the last byte of the packet data, which will in turn cause a CRC error when the packet is ultimately received.

Once the TX RD down counter 245 has reached a value of zero, the TX RD state machine 238 determines that the transfer FIFO 227 has been emptied. The transmit receive (TX-RX) pulse generator 246 provides signals which in one embodiment controls light emitting diodes (LEDs) to indicate that data is being either transmitted or received.

In the receive mode, preamble detect logic 250 detects that a preamble has been received by comparing the incoming data with a known preamble value, and detects that a start of a packet has been received by comparing the incoming data with a known Start Of Field (SOF) delimiter value. Preamble register REG 1 (251) stores the known preamble value (e.g., 55H) and preamble register REG 2 (252) stores the known SOF value delimiter (e.g., 5DH), so that the preamble detect logic can access these registers for these known values. The preamble detect logic also activates the receive write (RX WR) state machine 253. The packet length field, which typically follows the SOF delimiter, is stored in a receive write (RX WR) counter 254, which data may also be provided to the RX WR state machine 253.

The packet data is stored in the receive FIFO 228 via register REG 8 (255), multiplexer MUX 3 (256), and register REG 9 (257). Once there is data in the receive FIFO 228, the receive read (RX RD) counter 258 controls the receive FIFO 228 to provide the receive packet data to the MAC 222 via register REG 10 (259), multiplexer MUX 4 (260), register REG 11 (261), multiplexer MUX 5 (262), and register REG 12 (263). The RX RD counter 258 may also control MUX 4 (260) to provide the preamble from preamble REG 1 (251) and the SOF delimiter from preamble REG 2 (252). Register REG 11 (261), together with multiplexer MUX 5 (262), provides a translation from 8-bit bytes to 4-bit nibbles.

As indicated in FIG. 22, various registers and additional inputs on many of the multiplexers may be used in combination to provide diagnostic capability for various segments of the ASIC 220.

Having thus described at least one illustrative embodiment of the invention, various modifications and improvements will readily occur to those skilled in the art and are intended to be within the scope of the invention. Accordingly, the foregoing description is by way of example only, and not intended to be limiting.

What is claimed is:

1. An apparatus for transmitting data in packets having a first format dictated by a first protocol from a first network to a second network, comprising:

means for receiving a first packet of data in the first format from a source on the first network, the first packet of data having a variable length;

means for translating the first packet to a second packet of data which is a synchronous transport frame by directly inserting the first packet of data in the first format and a length of the first packet into the second packet of data; and means for transmitting the second packet across a third network which is a SONET network and is coupled between the first network and the second network, so that the second packet is received at the second network.

2. The apparatus of claim 1, wherein:

the first network is a local area network; and the means for receiving includes means for receiving the first packet from the local area network in a frame format which is native to the local area network.

3. The apparatus of claim 1, further comprising means for buffering the first packet of data to provide buffered data and means for determining the length of the first packet based upon the buffered data.

4. The apparatus of claim 1, wherein there is a transmission rate difference between the first and second networks and further comprising:

second means for receiving a third packet of data from a source on the second network;

means for buffering the third packet to account for the rate difference; and second means for transmitting the third packet to a destination on the first network over the second network.

5. The apparatus of claim 1, wherein the means for transmitting includes means for transmitting a fill pattern across the third network when no packets are received from the first network.

6. In a computer-implemented method for transmitting packet data received from a first network in a native LAN format across a second network in a synchronous transport frame, the frame including a transport overhead and a synchronous payload envelope (SPE), the method comprising the step of:

transmitting a variable length packet received from the first network over the second network in the synchronous transport frame, where the SPE of the synchronous transport frame further includes a packet length field and the variable length packet in the native LAN format.

7. The method of claim 6, the method further comprising a a step of transmitting a fill pattern when there are no pending frames to be sent in the synchronous transport frame.

8. The method of claim 6, further comprising a step of determining a packet length of the variable length packet.

9. The method of claim 8, wherein the step of determining the packet length includes receiving and storing the variable length packet in an input buffer.

10. The method of claim 6, wherein there is a transmission rate difference between the first and second networks and further comprising a step of receiving the packet from the first network at a first rate and wherein the step of transmitting is at a second rate.

11. The method of claim 10, wherein the step of transmitting includes a step of buffering data from the first network to account for the rate difference.

12. The method of claim 10, further comprising a step of:

transmitting the synchronous transport frame to a destination on a third network over the second network.

13. The method of claim 6, further comprising the step of receiving the synchronous transfer frame at a third network.

14. The method of claim 13, wherein the step of receiving includes a step of extracting the variable length packet from the synchronous transport frame.

15. The method of claim 13, wherein the third network is a LAN.

* * * * *